US012535197B2

(12) United States Patent
Bailey

(10) Patent No.: US 12,535,197 B2
(45) Date of Patent: Jan. 27, 2026

(54) LIGHTING SYSTEM WITH A DIFFUSER AND OPTICAL ELEMENTS

(71) Applicant: Autosystems, a division of Magna Exteriors Inc., Aurora (CA)

(72) Inventor: Edward Bailey, Rochester Hills, MI (US)

(73) Assignee: Autosystems, a division of Magna Exteriors Inc., Aurora (CA)

( * ) Notice: Subject to any disclaimer, the term of this patent is extended or adjusted under 35 U.S.C. 154(b) by 0 days.

(21) Appl. No.: 18/211,856

(22) Filed: Jun. 20, 2023

(65) Prior Publication Data

US 2023/0417391 A1 Dec. 28, 2023

Related U.S. Application Data

(60) Provisional application No. 63/354,536, filed on Jun. 22, 2022.

(51) Int. Cl.

*F21V 5/02* (2006.01)
*F21V 19/00* (2006.01)
*F21Y 115/10* (2016.01)

(52) U.S. Cl.

CPC ............ *F21V 5/02* (2013.01); *F21V 19/0015* (2013.01); *F21Y 2115/10* (2016.08)

(58) Field of Classification Search

CPC ............................ F21V 5/00–002; F21V 5/02
See application file for complete search history.

(56) References Cited

U.S. PATENT DOCUMENTS

| | | | | |
|---|---|---|---|---|
| 11,648,871 | B1 * | 5/2023 | Lan | B60Q 1/2607 340/458 |
| 2010/0066229 | A1 * | 3/2010 | Hamby | F21K 9/00 313/1 |
| 2010/0219935 | A1 | 9/2010 | Bingle et al. | |
| 2013/0176721 | A1 * | 7/2013 | Lu | F21V 7/048 29/527.1 |
| 2013/0249568 | A1 | 9/2013 | Botten | |
| 2014/0160743 | A1 * | 6/2014 | Ye | F21V 5/002 362/223 |
| 2014/0211467 | A1 * | 7/2014 | Yang | F21K 9/60 362/235 |
| 2014/0362566 | A1 * | 12/2014 | Tischler | F21V 7/00 362/230 |
| 2016/0109068 | A1 * | 4/2016 | Boonekamp | F21K 9/66 362/218 |
| 2018/0299082 | A1 * | 10/2018 | Li | F21V 15/01 |
| 2018/0367139 | A1 | 12/2018 | Pribisic et al. | |
| 2019/0346113 | A1 * | 11/2019 | Zhang | G02F 1/133621 |
| 2020/0370714 | A1 * | 11/2020 | Teather | F21V 5/045 |

(Continued)

FOREIGN PATENT DOCUMENTS

| | | | |
|---|---|---|---|
| WO | WO2011142535 | A2 | 11/2011 |
| WO | WO2020227826 | A1 | 11/2020 |

*Primary Examiner* — Tracie Y Green
*Assistant Examiner* — Michael Chiang
(74) *Attorney, Agent, or Firm* — Dority & Manning, P.A.

(57) ABSTRACT

A lighting system can include a light source comprising one or more LED chips. A cover can be optically coupled with the light source. A diffuser can be integrally formed with the cover. The diffuser can define a first region and a second region. The first region has a first asymmetrical optical element and the second region has a first symmetrical optical element.

18 Claims, 22 Drawing Sheets

(56) References Cited

U.S. PATENT DOCUMENTS

| | | | | |
|---|---|---|---|---|
| 2022/0196221 | A1 | 6/2022 | Sabatini et al. | |
| 2022/0299184 | A1 | 9/2022 | Traian et al. | |
| 2023/0012854 | A1* | 1/2023 | Walters | F21S 41/143 |
| 2023/0056771 | A1 | 2/2023 | Miu et al. | |
| 2023/0194068 | A1* | 6/2023 | Lim | F21V 5/04<br>362/217.02 |

* cited by examiner

LIGHTING SYSTEM WITH A DIFFUSER AND OPTICAL ELEMENTS

CROSS-REFERENCE TO RELATED APPLICATION

The present application claims priority to U.S. Provisional Patent Application Ser. No. 63/354,536, filed on Jun. 22, 2022, the contents of which are hereby incorporated by reference in their entirety.

FIELD

The present disclosure relates to lighting systems and a method of manufacturing the same, and more particularly, to flexible lighting systems that may incorporate one or more light-emitting diodes (LEDs).

BACKGROUND

LEDs generally have an increased lifespan, reduced power consumption, and faster electrification time when compared with incandescent filaments. This has given LEDs a wide use in various applications. In some cases, a diffuser may be used in conjunction with the LEDs to direct light emanated from the LEDs in defined directions. However, improved diffusers capable of new, unique designs would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a lighting system for a vehicle that includes a light source comprising one or more LED chips. A cover is optically coupled with the light source. A diffuser is integrally formed with the cover. The diffuser defines a first region and a second region. The first region has a first asymmetrical optical element and the second region has a first symmetrical optical element.

In some aspects, the present subject matter is directed to a method for manufacturing a lighting system. The method includes generating, with a computing system, a geometric shape for a printed circuit board, the circuit board having a non-planar profile. The method further includes determining, with the computing system, a position of one or more light sources operably coupled with the circuit board. The method additionally includes generating, with the computing system, a geometric shape of a cover optically coupled with the one or more light sources. Further, the method includes generating, with the computing system, one or more UV spans to represent a profile of a diffuser integral to the cover. Lastly, the method includes determining, with the computing system, a position of a first optical element based on a location of the one or more light sources relative to the one or more UV spans.

In some aspects, the present subject matter is directed to a lighting system that includes a flexible circuit board and one or more LED chips on board operably coupled with the circuit board. A cover is optically coupled with the one or more LED chips on board. A diffuser is integrally formed with the cover. The diffuser defines a first region, a second region, and a third region positioned between the first region and the second region. The first region defines a first segment having a first optical element and a second segment having a second optical element, the second region has a third optical element, and the third region includes interspersed fourth and fifth optical elements.

Further aspects are provided by the subject matter of the following clauses:

A lighting system for a vehicle, the lighting system comprising: a light source comprising one or more LED chips; a cover optically coupled with the light source; and a diffuser integrally formed with the cover, the diffuser defining a first region and a second region, wherein the first region has a first asymmetrical optical element and the second region has a first symmetrical optical element.

The lighting system of one or more of these clauses, wherein the one or more LED chips are configured as mini-chip LEDs or micro-chip LEDs.

The lighting system of one or more of these clauses, wherein at least one of the one or more LED chips are configured as an LED chip on board (COB).

The lighting system of one or more of these clauses, further comprising: a flexible circuit board operably supporting the light source.

The lighting system of one or more of these clauses, further comprising: a housing positioned at least partially on an opposing side of the circuit board from the light source, wherein a width of an outer surface of the housing to an outer surface of the cover is less than approximately 6 millimeters.

The lighting system of one or more of these clauses, wherein the asymmetrical optical element produces an elliptical diffusion pattern producing a homogenized line of visible light for a defined length.

The lighting system of one or more of these clauses, wherein the homogenized line of visible light has a width in a y-direction that is between approximately 1.5 millimeters and approximately 2.5 millimeters.

The lighting system of one or more of these clauses, wherein the diffuser further comprises: a third region positioned between the first region and the second region, wherein the third region includes a first segment including a second asymmetrical optical element and a second segment including a second symmetrical optical element.

The lighting system of one or more of these clauses, wherein a diffusion pattern of the first asymmetrical optical element is varied from a diffusion pattern of the second asymmetrical optical element.

A method for manufacturing a lighting system, the method comprising: generating, with a computing system, a geometric shape for a printed circuit board, the circuit board having a non-planar profile; determining, with the computing system, a position of one or more light sources operably coupled with the circuit board; generating, with the computing system, a geometric shape of a cover optically coupled with the one or more light sources; generating, with the computing system, one or more UV spans to represent a profile of a diffuser integral to the cover; and determining, with the computing system, a position of a first optical element based on a location of the one or more light sources relative to the one or more UV spans.

The method of one or more of these clauses, wherein the one or more light sources are configured as LED chips on board.

The method of one or more of these clauses, wherein a set of parametric patch generation equations map values of the UV spans to a three-dimensional space defining the profile of the diffuser.

The method of one or more of these clauses, further comprising: determining a position of a second optical element that is positioned in an offset location from the first optical element.

The method of one or more of these clauses, further comprising: generating, with the computing system, an optic map that illustrates the location of each optical element within each region of the diffuser.

The method of one or more of these clauses, wherein determining the position of the first optical element based on a location of the one or more light sources relative to the one or more UV spans is at least partially based on a curvature of the circuit board, a curvature of the cover, and a z-distance between the one or more light sources and the first optical element.

A lighting system comprising: a flexible circuit board; one or more LED chips on board operably coupled with the circuit board; a cover optically coupled with the one or more LED chips on board; and a diffuser integrally formed with the cover, the diffuser defining a first region, a second region, and a third region positioned between the first region and the second region, wherein the first region defines a first segment having a first optical element and a second segment having a second optical element, the second region has a third optical element, and the third region includes interspersed fourth and fifth optical elements.

The lighting system of one or more of these clauses, wherein a concentration of the fourth optical element is varied from a first side portion of the third region to a second side portion of the third region.

The lighting system of one or more of these clauses, wherein a concentration of the fifth optical element is varied from a first side portion of the third region to a second side portion of the third region.

The lighting system of one or more of these clauses, wherein the second optical element having a varied diffusion pattern from the first optical element.

The lighting system of one or more of these clauses, wherein the first optical element is offset from at least one of the one or more LED chips on board based on a curvature of the circuit board, a curvature of the cover, and a z-distance between the at least one of the one or more LED chips on board and the first optical element.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
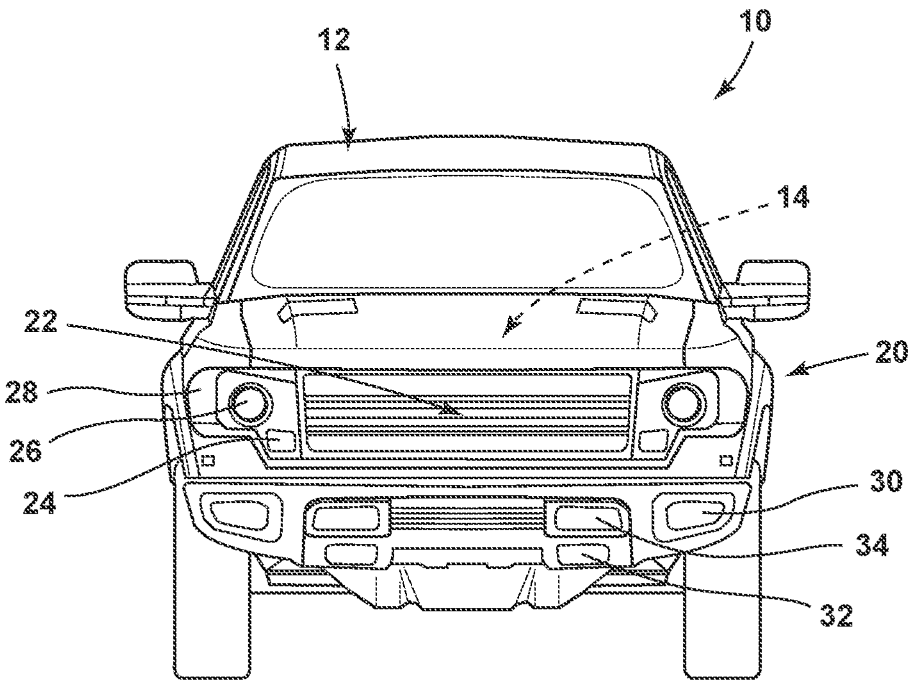
FIG. 1 illustrates a front plan view of a vehicle implementing one or more lighting systems in accordance with various aspects of the present disclosure.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The term "selectively" refers to a component's ability to operate in various states (e.g., an ON state and an OFF state) based on manual and/or automatic control of the component.

As used herein, an "x-direction" corresponds to a length (e.g., a long dimension) of a LED chip, a "y-direction" corresponds to a width of a LED chip, and a z-direction corresponds to a vertical distance from a LED chip. In addition, "pitch" corresponds to a chip-to-chip distance between two LED chips in one of their x-direction and their y-direction.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, example aspects of the present subject matter are directed to a lighting system that can include a light source comprising one or more LED chips. In some instances, the one or more LED chips can be configured as mini-chip LEDs or micro-chip LEDs. In addition, in various examples, at least one of the one or more LED chips can be configured as an LED chip on board (COB). In various instances, the lighting system may be flexible and capable of having a radius of curvature less than approximately 10 millimeter (mm) radius, or even down to approximately 2 mm radius. In some cases, the LED chips may be coupled with a circuit board, such as a printed circuit board (PCB), that is formed from one or more sheets that can be positioned in a non-planar profile to produce free-form contours. In addition, individual circuits may be formed from a material, such as copper, which can be designed to dissipate heat in tandem with a substrate of the circuit board, which may be formed from a material such as aluminum. In addition, a material, such as a polyimide, may be adhered to the substrate, which can provide for the flexing of a dielectric without cracking, thereby providing for the maintenance of dielectric strength while allowing for the circuit board to be positioned in non-planar positions.

Individual circuits of the circuit board can energize the LED chips individually at a tight pitch (e.g., as close as 0.5 millimeters) to provide a higher resolution display capable of depicting graphics, pictograms, text, and numerals which greatly enhanced visibility. In some instances, the direct emission capability of the lighting system can enable high efficiency of greater than approximately 90%, 16-bit grey-scale dimming, which may be used for smooth transitions, fluid graphics, and a contrast ratio of greater than 1000:1. The brightness of the display can approach approximately 10,000 nits cd/m$^2$, which can enable exterior lighting, signaling, and messaging. The LED chips can have a lifetime, e.g., 50,000 hours when operated below one hundred and fifty (150) degrees Celsius (C). In some instances, silicone materials may be operably coupled with the LED chips, which can maintain transparency over the temperature in the visible wavelengths.

A cover is optically coupled with the light source. A diffuser can be integrally formed with the cover. In various examples, the diffuser may have one or more regions. For example, a first region may be optically coupled with a first set of light sources, a second region may be optically coupled with a second set of light sources, and a third region may be optically coupled with a third set of light sources. In some instances, the third region may be a transitional region between the first and second regions. In some cases, the third region may include a variable concentration of optical elements within a first portion of the third region relative to a second portion of the third region (e.g., the first portion of the third region can be more densely populated with optical elements than the second portion of the third region). The first portion may be positioned adjacent to the first region and includes a first concentration of optical elements. A second portion may be positioned on an opposing side of the first portion from the first region and includes a second concentration of optical elements. The second concentration may be less than the first concentration.

Figure 2:
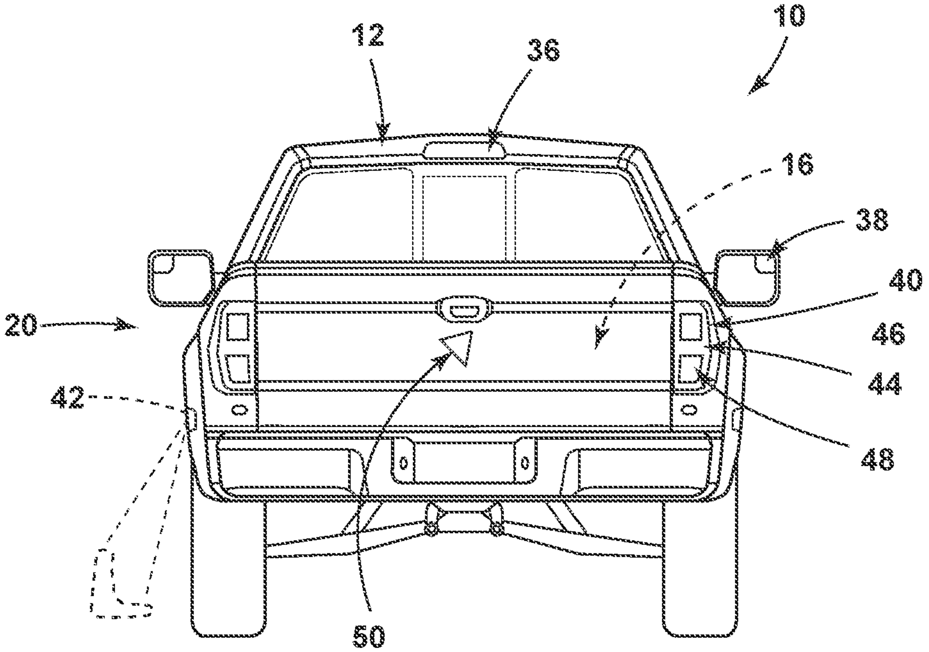
FIG. 2 illustrates a rear plan view of the vehicle implementing the one or more lighting systems in accordance with various aspects of the present disclosure.
Figure 3:
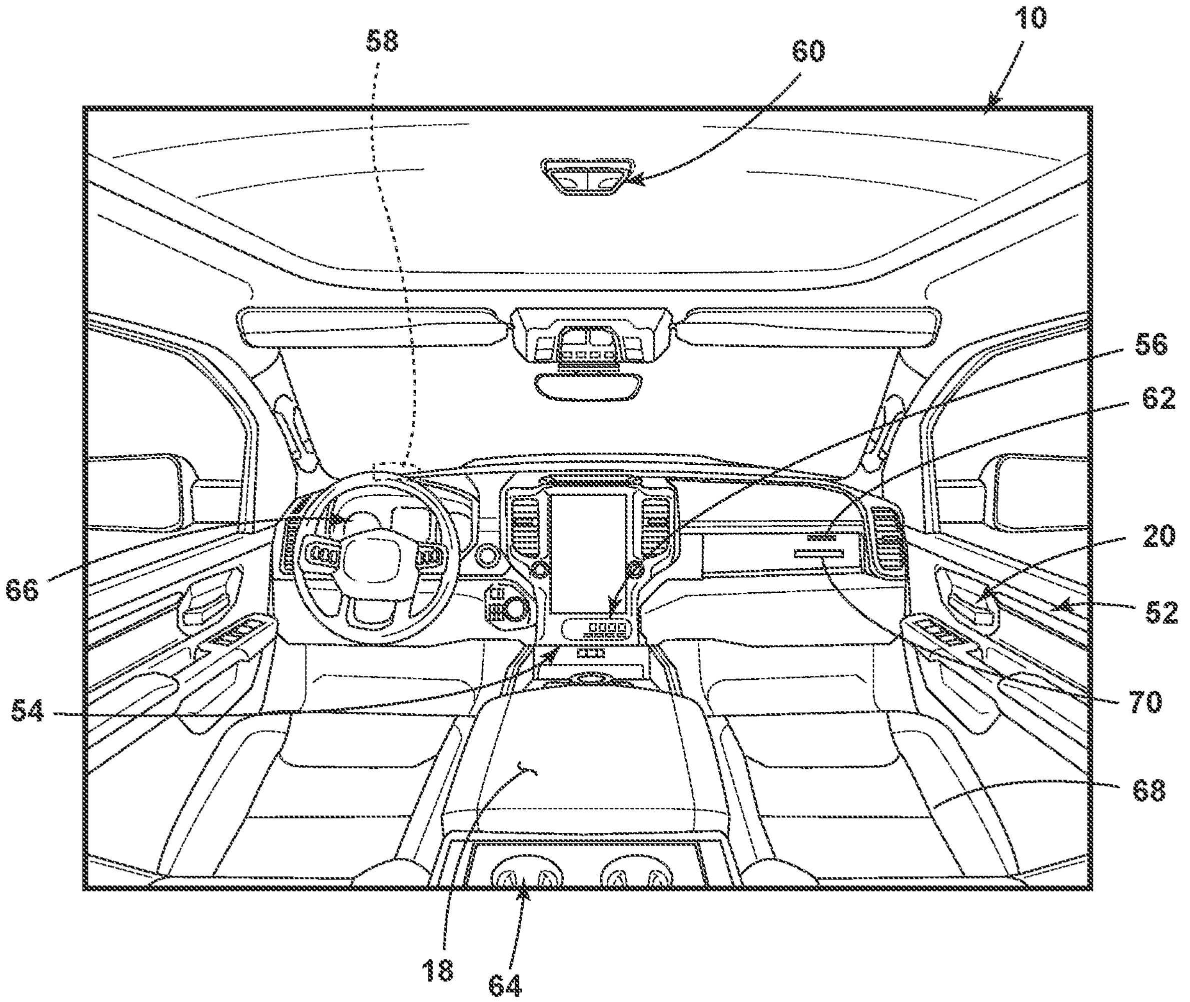
FIG. 3 illustrates a front perspective view of a passenger compartment of the vehicle implementing one or more lighting systems in accordance with various aspects of the present disclosure.
Figure 4:
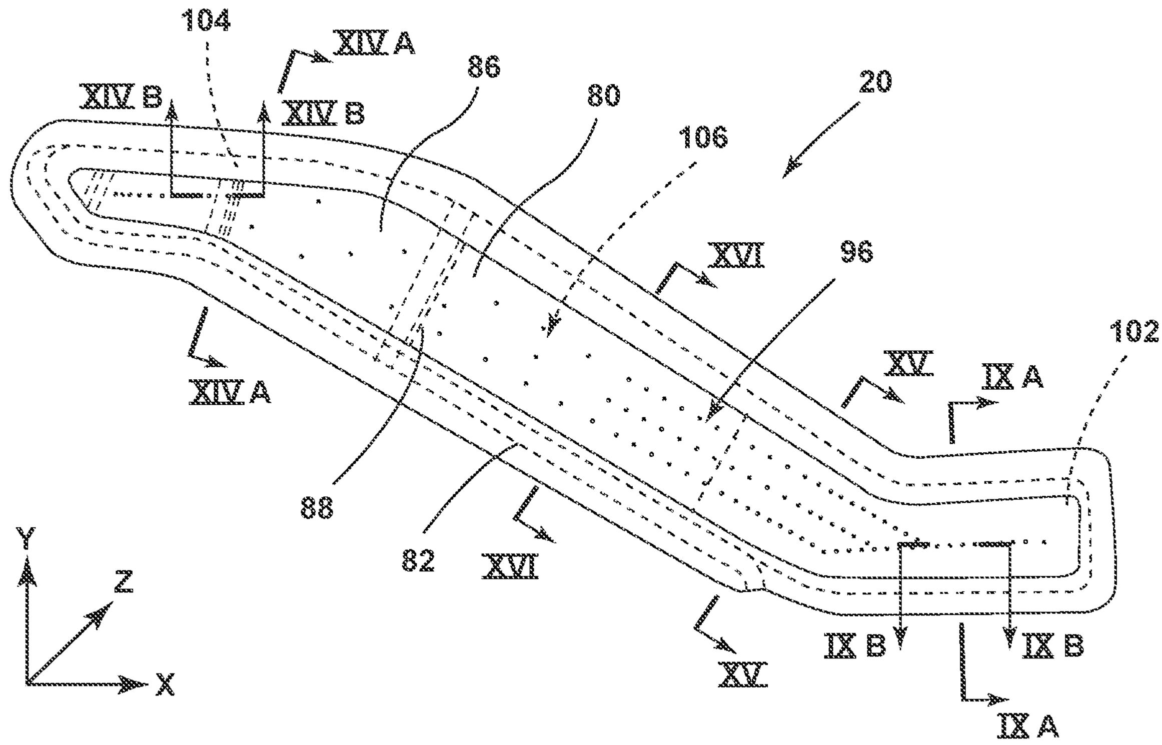
FIG. 4 illustrates a front perspective view of the lighting system in accordance with various aspects of the present disclosure.

Referring now to FIGS. 1-3, a vehicle 10 including a body structure 12 is illustrated in accordance with various aspects of the present disclosure. The body structure 12 can define one or more compartments, which can include a front compartment 14 (e.g., an engine compartment or a front trunk), a rear compartment 16 (e.g., a bed or a rear trunk), and/or a passenger compartment 18, which may be a space in which an occupant of the vehicle 10 may sit. While the vehicle 10 is depicted as a truck, it will be understood that the vehicle 10 may be a sedan, van, sport utility vehicle, cross-over, or another vehicle 10 without departing from the teachings provided herein.

Referring further to FIGS. 1-3, a lighting system 20 may be operably coupled with the vehicle 10. For instance, the lighting system 20 may be positioned along an exterior portion of the body structure 12 and/or within one or more of the compartments defined by the body structure 12. For example, as illustrated in FIG. 1, the lighting system 20 may be configured as a lighted display grill 22, a running and/or signal light 24, a headlight 26, a marker 28, a fog light 30, a secondary fog light 32, and/or a hazard light 34. In addition, in some instances, as illustrated in FIG. 2, the lighting system 20 may be configured as a center high mounted stop lamp (CHMSL) 36, a driver assistance light for blind spot and proximity 38, a turn signal 40, an entrance/exit lamp 42, a tail lamp 44, a stoplight 46, a reverse light 48, and/or an emblem 50. Further, as illustrated in FIG. 3, in some cases, the lighting system 20 may be configured as an ambient light 52, a backlight 54 for a user interface 56, a component of a heads-up display 58, a dome light 60, a feature light 62, a cupholder light 64, a dashboard indicator 66, an interior light device 68 positioned along contours of vehicle seats, door panels, consoles, and other interior vehicle surfaces, an emblem 70, and/or any other type of lighting device. It will be appreciated that the listed locations are for reference to potential locations. As such, the lighting system 20 may be operably coupled with any other portion of the vehicle 10 without departing from the teachings of the present disclosure. Further, it will also be appreciated that the lighting system 20 may be used in implementations that are remote from the vehicle 10. In such instances, the lighting system 20 may include any feature disclosed herein without departing from the scope of the present disclosure.

In some examples, the lighting system 20 may include one or more light sources, optical systems, electronic drivers, and/or sensors. Moreover, the lighting system 20 may include and/or be operably coupled with a controller. In general, the controller may comprise any suitable processor-based device known in the art, such as a computing device or any suitable combination of computing devices. Thus, in several embodiments, the controller may include one or more processor(s) and associated memory device(s) configured to perform a variety of computer-implemented functions. It will be appreciated that, in several embodiments, the controller may correspond to an existing controller of the vehicle 10, or the controller may correspond to a separate processing device. For instance, in some embodiments, the controller may be implemented within the lighting system 20 to allow for the disclosed lighting system 20 to be implemented without requiring additional software to be uploaded onto existing control devices of the vehicle 10. In various examples, the lighting system 20 may be capable of providing various functions, such as illumination of nearby objects, illumination of the vehicle 10 (or a portion thereof) for detection by nearby objects, messaging, warnings, navigation, guidance, weather, social communication, and/or any other function. In addition, the lighting system 20 may be configured to provide static and/or dynamic lighting characteristics. As used herein, static lighting characteristic means that a lighting pattern may remain consistent for a defined amount of time and a dynamic lighting characteristic means that a lighting pattern is altered during the defined amount of time.

Figure 9A:
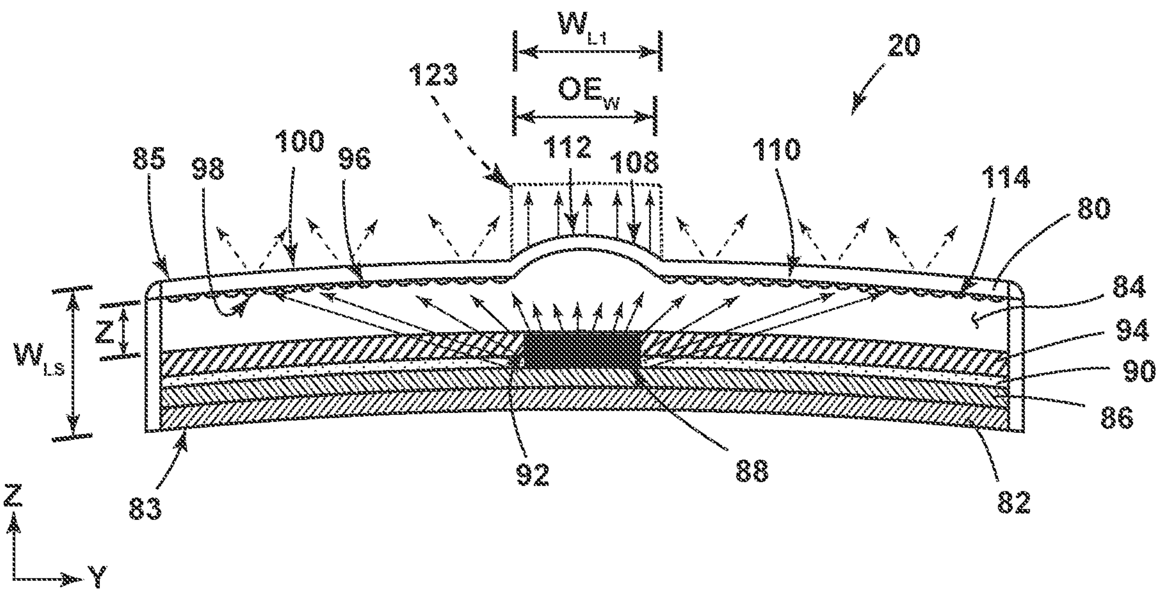
FIG. 9A is a cross-sectional view of the lighting system of FIG. 4 taken along the line IXA-IXA in accordance with various aspects of the present disclosure.
Figure 9B:
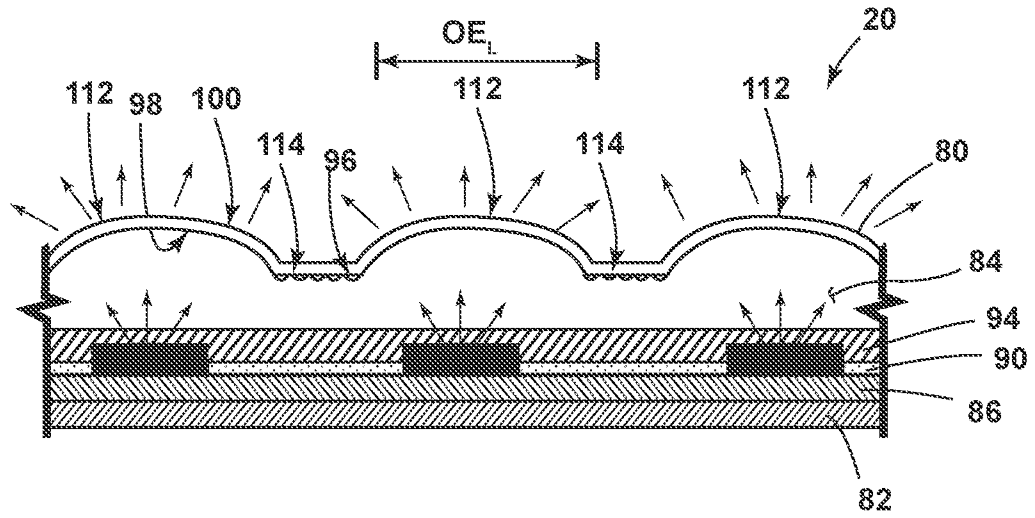
FIG. 9B is a cross-sectional view of the lighting system of FIG. 4 taken along the line DCB-DCB in accordance with various aspects of the present disclosure.

Referring now to FIGS. 4-16, in some examples, the lighting system 20 may include a cover 80, or lens, and a housing 82 that forms a cavity 84 therebetween. In some instances, a circuit board, such as a printed circuit board (PCB), may be configured to electrify one or more light sources 88. Each of the circuit board 86 and the one or more light sources 88 may be positioned within the cavity 84. As such, the housing 82 may be positioned at least partially on an opposing side of the circuit board 86 from the light sources 88. Moreover, in various examples, a width WLS (FIG. 9A) of an outer surface 83 of the housing 82 to an outer surface 85 of the cover 80 can be less than approximately 50 millimeters, less than approximately 40 millimeters, less than approximately 30 millimeters, about less than about approximately 10 millimeters, less than approximately 6 millimeters, and/or less than any other width.

The cover 80 may be formed from a rigid material that includes a curable material such as a polymerizable compound, a mold in clear (MIC) material, or mixtures thereof. Acrylates may also be used for forming the cover 80, as well as polymethyl methacrylate (PMMA) and/or any other practicable material. Alternatively, the cover 80 may be flexible light or capable of elastic deformation, wherein a suitable flexible material is used to create the cover 80. Such flexible materials include urethanes, silicone, thermoplastic polyurethane (TPU), or other optical-grade flexible materials.

The circuit board 86 may be positioned within the cavity 84 and configured to electrify or energize the one or more light sources 88. The circuit board 86 may be manufactured from a glass-reinforced epoxy laminate material (e.g., FR4), an insulated metal substrate (IMS), a thermally conductive metal substrate upon which is applied a dielectric insulator between the Cu traces used to light the LED's and the metal used to conduct the heat. Other laminates may comprise woven glass fabric surfaces and non-woven glass core combined with epoxy synthetic resin (e.g., CEM-1, CEM-2, CEM-3, CEM-4, and/or CEM-5), a glass, or any other practicable material. In some examples, the circuit board 86 may be ceramic-filled. In some instances, the circuit board 86 can include embedded ceramic particles, such as boron nitride or alumina, which may improve a thermal conductivity of the circuit board 86. The improved thermal conductivity can allow the one or more light sources 88 to operate at lower temperatures thereby improving the performance and efficiency of the lighting system 20. In addition, the circuit board 86 may be flexible (e.g., capable of conforming to a non-linear profile without degradation in performance).

With further reference to FIGS. 5-13B, a circuit on the circuit board 86 may be formed through one or more traces, which can be of copper, or another material. The traces may further be plated with electroless nickel and immersion gold (ENIG) to enhance the adhesion of solder to the traces and to mitigate against tarnishing in harsh environments. In some instances, a dielectric, such as a polyimide dielectric, can isolate electrically the one or more traces forming the circuit from the circuit board 86 substrate.

In the illustrated examples, each of the one or more light sources 88 may include one or more LED chips soldered to the circuit board 86 on a surface of the traces (e.g., the ENIG traces). In some instances, the individual traces electrify the LED chips individually at a tight pitch (e.g., as close as approximately 0.5 mm) to enable a higher resolution display capable of illustrating graphics, such as pictograms, text, numerals, and/or any other information. Moreover, the LED chips may each be configured as an LED chip on board (COB). In some examples, the LED COB can be designed to occupy 100-350 μm (e.g., mini chips) and 2-100 μm (e.g., microchips). In addition, configurations of micro LED chips with a size of less than 50 μm may have a sapphire or Si substrate removed, such as by UV excimer or via grinding etch, or polishing may be utilized as light sources 88. In some instances, by using an LED chip on board versus a standard 3030 or 3.0×3.0 mm package, a light source 88 that is less than 1% the original size (e.g., 0.06 $mm^2$ or (350×170 μm chip)/9 $mm^2$=<1%) may be used within the lighting system 20. Otherwise stated, the space savings of each LED chip on the circuit board 86 can be over 99% when compared to a standard 3030 or 3.0×3.0 mm package.

In some implementations, the LED chips may be positioned at a first pitch in the x-direction. For instance, the LED chips can be positioned end to end in the x-direction to create generally uniform lines of light. In alternative implementations, the LED chips can be spaced apart from one another along the x-direction to produce more defined pixels which can be flashed, or varied in intensity, to produce defined lighting effects. As LED chips are placed closer together in the x-direction, the uniformity from pixel to pixel increases without loss of information display (e.g., the ability of a lit circuit to display good definition figures, graphics, and text). Conversely, as the x-direction pitch increases, manufacturing cost may decrease, but information display capability may also decrease. In various implementations, the LED chips may be positioned at a second pitch in the y-direction. The second pitch may be larger than the first pitch. For instance, in some examples, the second pitch may be approximately 0.5 mm.

In some instances, a photoluminescent layer 92 may be optically coupled with the light sources 88 of the LED chips. The photoluminescent layer 92 may be arranged as a coating, layer, film, or other suitable deposition. The photoluminescent layer 92 may include at least one energy-converting element with phosphorescent or fluorescent properties. For example, the photoluminescent layer 92 may include organic or inorganic fluorescent dyes including rylenes, xanthenes, porphyrins, phthalocyanines. Additionally or alternatively, the photoluminescent layer 92 may include phosphors from the group of Ce-doped garnets, such as YAG:Ce.

Additionally, the lighting system 20 may include a solder mask 90 and/or a conformal coating 94 to help extract light from the LED chips. The conformal coating 94 may protect the LED chips from the environment. In various examples, the conformal coating 94 may be formed from a silicone material and/or any other practicable material.

In operation, when one or more LED chips is electrified or energized, light emanates from each of the electrified LED chips. The light produced from the LED chip emerges in a distribution pattern that may be Lambertian. As such, the distribution pattern may be approximately one hundred and twenty (120) degrees full angle distribution at half peak intensity and approximately one hundred and forty (140) degrees to approximately one hundred and sixty-five (165) degrees field angle distribution at ten percent of peak intensity.

In several implementations, a diffuser 96 may be used to reduce dips in light produced between areas of high illuminance above respective light sources 88 (e.g., LED chips). As illustrated, the diffuser 96 may be integrally formed with the cover 80 and/or attached thereto. Additionally, or alternatively, the diffuser 96 may be positioned between the cover 80 and the light sources 88 without departing from the scope of the present disclosure. In addition, a z-pitch z may be defined between the diffuser 96 and the light sources 88 to allow for light spreading prior to the light emanated from the light source reaching the diffuser 96. In some configurations, for example, the diffuser 96 may be placed at a distance equivalent to the LED chip pitch. For example, a 1:1 ratio of y-direction pitch-to-vertical distance may yield acceptable uniformity performance, as measured by max/min variation of less than approximately fifteen percent (15%), constituting approximately eight-five percent (85%) uniformity.

Still referring to FIGS. 4-13B, the diffuser 96 includes a diffuser input surface 98 to receive light emanating from the LED chips and a diffuser output surface 100 to transform the received light. As provided herein, the diffuser input surface 98 may correspond to a B-surface of the cover 80, and the diffuser output surface 100 may correspond to an A-surface of the cover 80. The diffuser input surface 98 is disposed a selected distance in the z-direction from light output surfaces of the plurality of LED chips.

In various examples, the diffuser 96 may have one or more regions. For example, the lighting system 20 illustrated in FIGS. 4-13B includes a first region 102 that may be optically coupled with a first set of light sources 88, a second region 104 may be optically coupled with a second of light sources 88, and a third region 106 may be optically coupled with a third set of light sources 88. In some instances, the third region 106 may be a transitional region between the first region 102 and the second region 104 having a varied concentration of optical elements 128, 130 from a first end portion to a second end portion. It will be appreciated that any of the first set of light sources 88, the second set of light sources 88, and the third set of light sources 88 may include at least one common light source 88 that emanates light therefrom into more than one region 102, 104, 106.

Each region 102, 104, 106 may have one or more diffusive segments that are configured to collimate or diffract light that emanates from one or more light sources 88 of the lighting system 20. Moreover, each diffusive segment may include one or more types of optical elements 112, 114, 122, 128, 130 that are common or varied from any other region 102, 104, 106 of the lighting system 20. For instance, a first region 102 may include a diffusive segment having light collimating optical elements 112, which may be in the form of an elliptical diffuser, one or more lenslets, and/or any other structure and/or a diffusive segment having light diffracting optical elements 114, which may be in the form of a circular diffuser, one or more lenslets, pillow optics, and/or any other structure. Moreover, the one or more diffusive segments within a common region 102, 104, 106 may also be common or varied from any other diffusive segment within the same region 102, 104, 106.

In some examples, the diffuser 96 can define a first region 102 and a second region 104. The first region 102 has a first asymmetrical optical element 112 and the second region 104 has a second symmetrical optical element 114. The second region 104 can have a third optical element 122. The third region 106 can include a first segment including a fourth optical element 128, which may be a second asymmetrical optical element, and a second segment including a fifth optical element 130, which may be a second symmetrical optical element. In some instances, the diffusion pattern of the first asymmetrical optical element is varied from the diffusion pattern of the second asymmetrical optical element.

Figure 5:
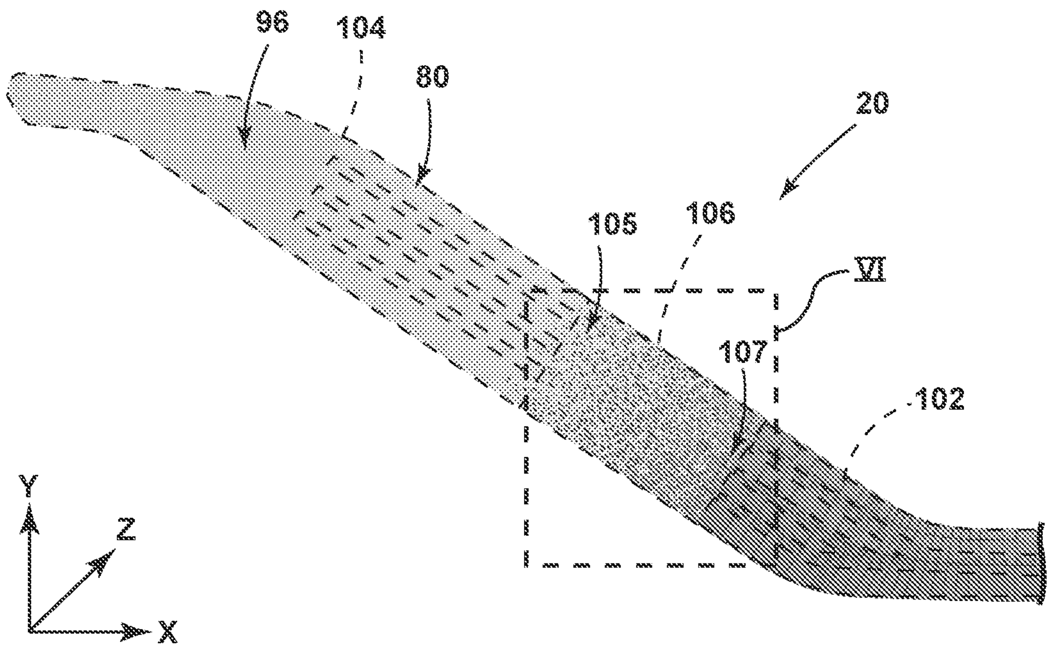
FIG. 5 illustrates a front plan view of a cover of the lighting system having integrally formed optical elements in accordance with various aspects of the present disclosure.
Figure 6:
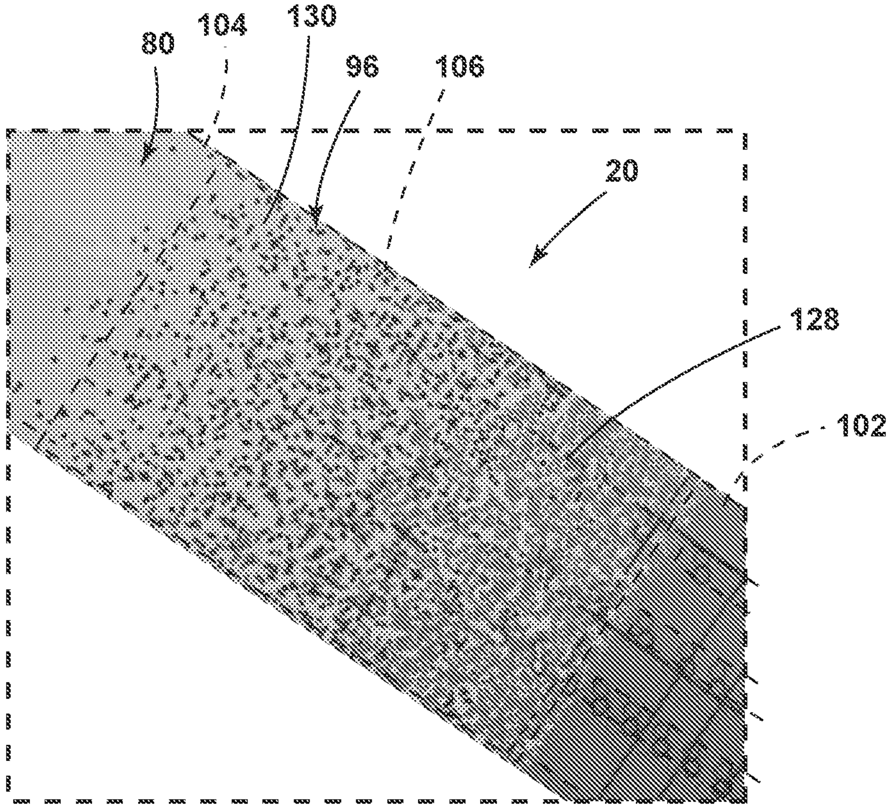
FIG. 6 is an enhanced view of area VI of FIG. 5.
Figure 7:
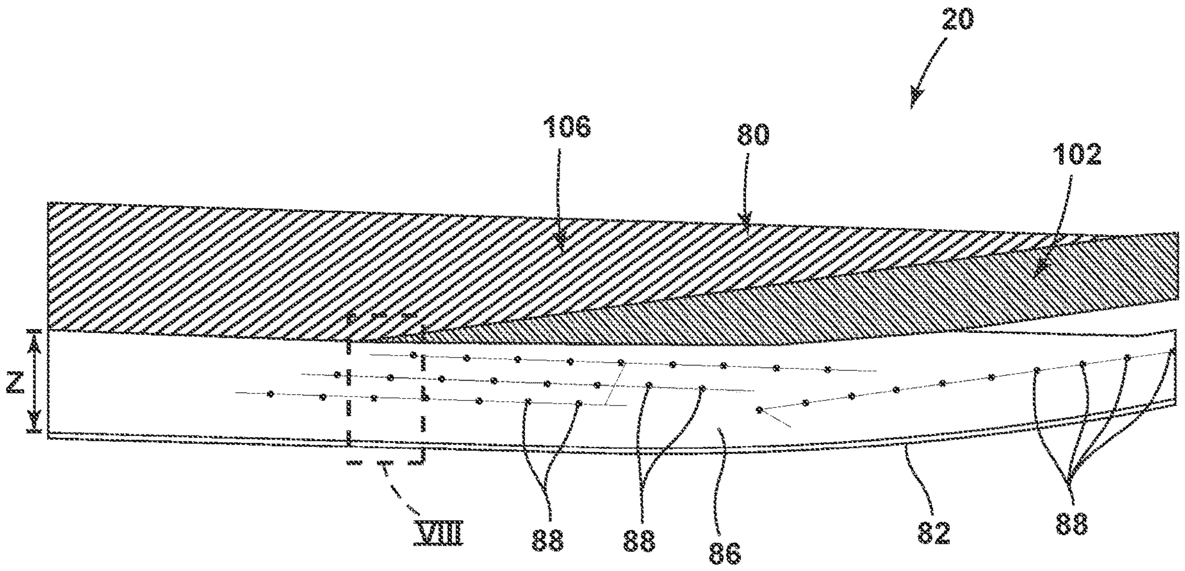
FIG. 7 is a perspective view of the lighting system in accordance with various aspects of the present disclosure.
Figure 8A:
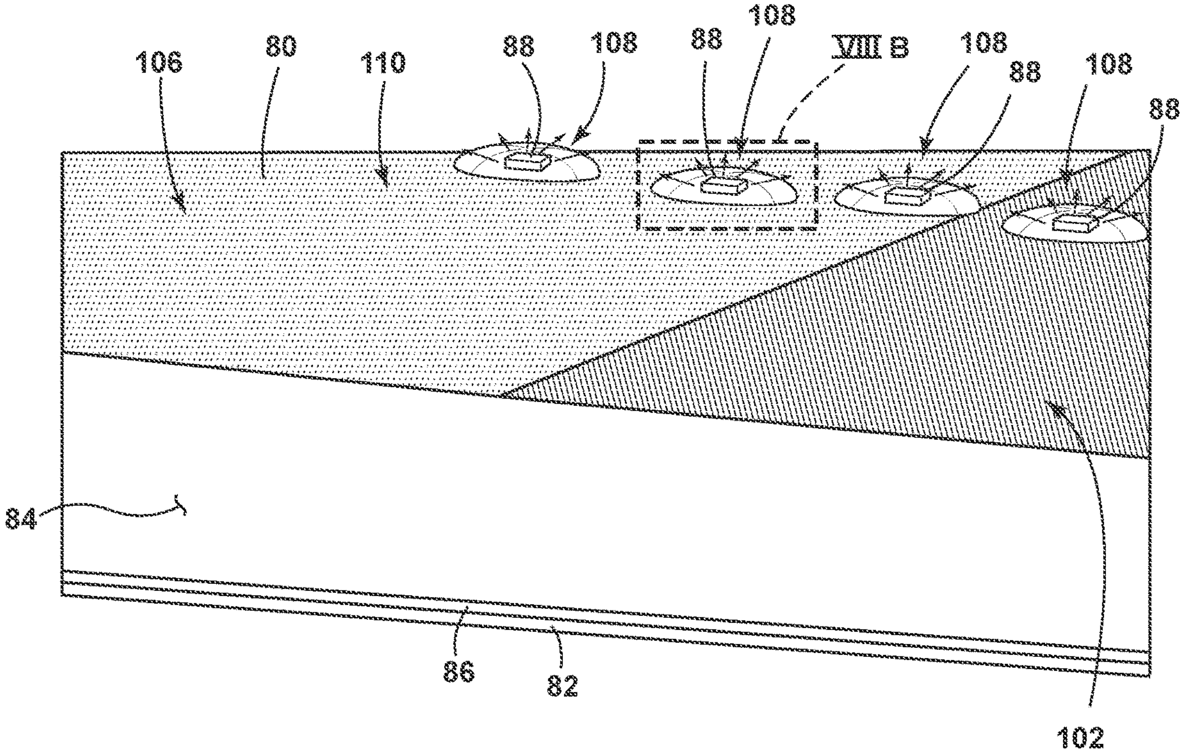
FIG. 8A is an enhanced view of area VIII of FIG. 7.
Figure 8B:
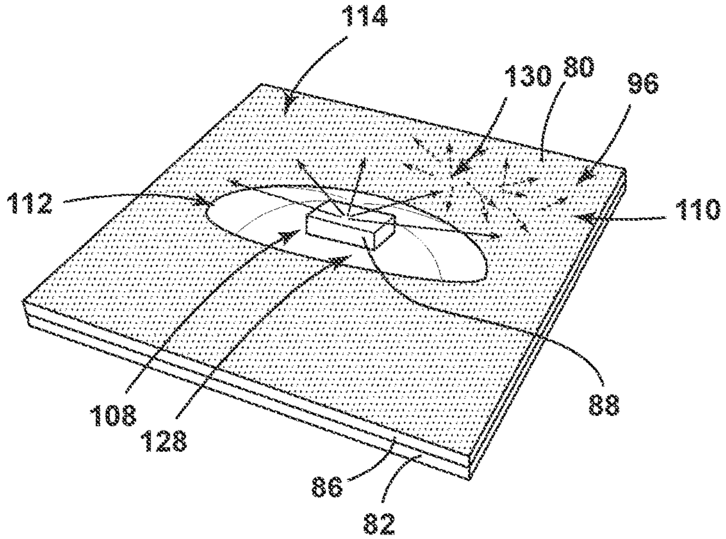
FIG. 8B is a further enhanced view of area VIIIB of FIG. 8A.

Referring still to FIGS. 5 and 6, as provided herein, the third region 106 may be a transitional region that is positioned between the first region 102 and the second region 104. In some instances, the third region 106 may include a variable concentration of optical elements 128, 130 between a first portion 105 of the third region 106 and a second portion 107 of the third region 106. For example, in the lighting system 20 illustrated in FIGS. 5 and 6, the first portion 105 may be positioned adjacent to the first region 102 and includes a first concentration of optical elements 128, 130. The second portion 107 may be positioned on an opposing side of the first portion 105 from the first region 102 and includes a second concentration of optical elements 128, 130. As illustrated, the second concentration may be less than the first concentration. As such, in some instances, the third region 106 may transition collimated light emitted from the first region 102 into generally more dispersed light as the emitted light approaches the second region 104.

With further reference to FIGS. 7-9B, in some examples, the first region 102 of the diffuser 96 may include a first segment 108 and a second segment 110. The first segment 108 may be configured as one or more elliptical diffusers optically coupled with arrays of many light sources 88 with the cavity 84 defined between each respective first segment 108 and the light sources 88. In some instances, the first segment 108 can include an asymmetrical optical element 112 that can produce an elliptical (or an extreme elliptical) diffusion pattern converting the linear point light sources 88 into a generally homogenized line 123 of visible light for a defined length. In various examples, the generally homogenized line 123 of visible light may have a width $W_{L1}$ in a y-direction that is between approximately 1.5 mm and approximately 2.5 mm. In other examples, the generally homogenized line 123 of visible light may have a width $W_{L1}$ in a y-direction that is approximately equal to, less than, or greater than 5 mm. In some instances, the first segment 108 may be configured to produce sixty (60) degrees by one (1) degree ellipticity, forty (40) degrees by one (1) degree ellipticity, twenty (20) degrees by one (1) degree ellipticity, and/or any other desired ellipticity based on the location of the light sources 88 relative to one another. In some instances, the use of an elliptical primary lens over the light source 88 (e.g., LED chip) can convert the light distribution off the light sources 88 from rotationally symmetric to something with a more elliptic beam. When used in tandem with the asymmetric diffusion layer physically distanced from the light source 88 the overall system can become more compact, or increase net asymmetry from 60×1 to 900×1 thereby allowing the light sources 88 to be placed at a larger pitch, which can reduce cost. In some examples, the asymmetrical optical element 112 may be generally ellipsoidal or partially ellipsoidal. In addition, the asymmetrical optical element 112 may have a width $OE_W$ that is less than its length $OE_L$.

In some instances, the second segment 110 may be interspersed between the first segments 108. The second segment 110 may be configured to soften and/or homogenize incident light emanated from the light sources 88 and received by the diffuser 96 at a location external from the first segment 108. In various examples, the optical elements 114 within the second segment 110 may be configured as a symmetrical diffuser of thirty (30) degrees, sixty (60) degrees, eighty (80) degrees, and/or any other optic (e.g., any lenslet, microstructure, pillow lens, etc.).

It will be appreciated that the light emanated from the optical elements within the first segment 108 (e.g., from the asymmetrical optical element 112) are generally illustrated in the drawings as solid lines externally from the light source 20. Conversely, the light emanated from the optical elements 114 within the second segment 110 (e.g., from the symmetrical optical elements) are generally illustrated in the drawings as dashed lines externally from the light source 20.

Figure 10A:
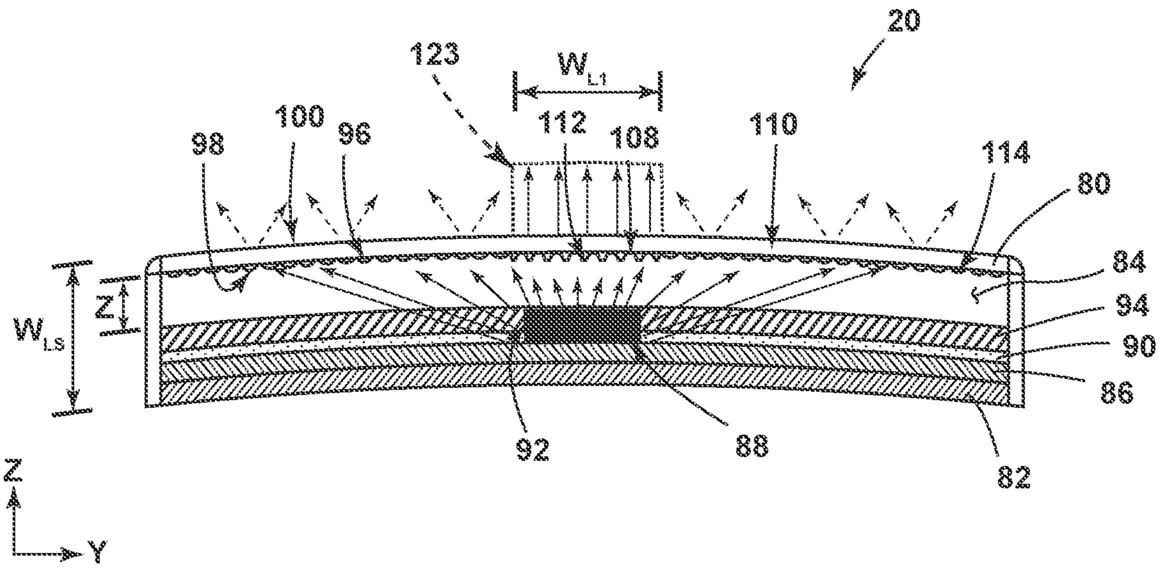
FIG. 10A is a cross-sectional view of the lighting system of FIG. 4 taken along the line IXA-IXA in accordance with various aspects of the present disclosure.
Figure 10B:
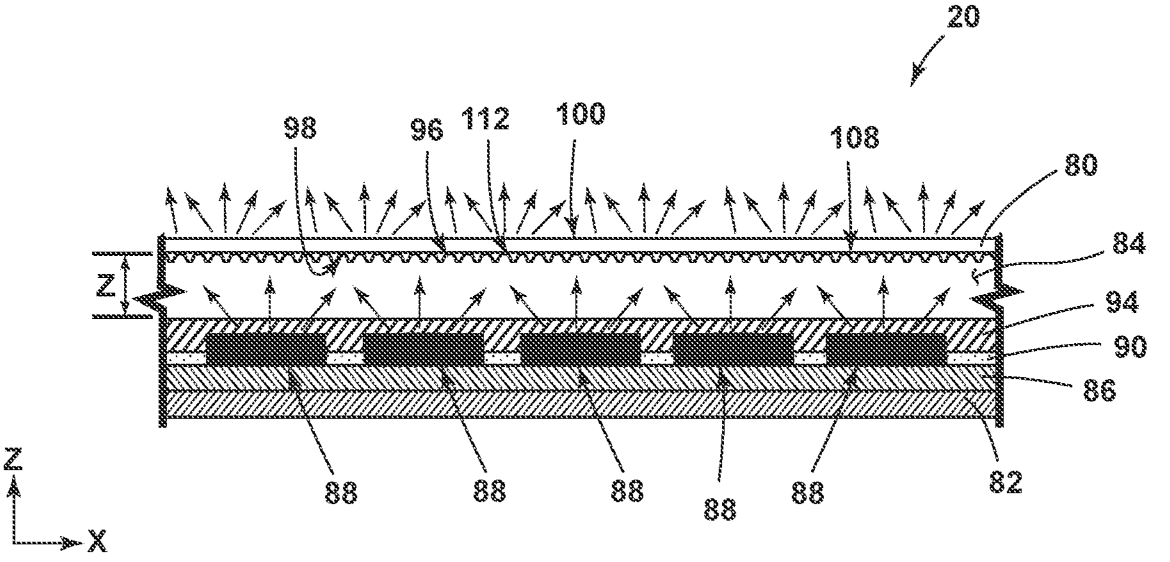
FIG. 10B is a cross-sectional view of the lighting system of FIG. 4 taken along the line DCB-DCB in accordance with various aspects of the present disclosure.

With reference to FIGS. 10A and 10B, in some examples, the first region 102 of the diffuser 96 may include the first segment 108 and the second segment 110. As provided herein, the first segment 108 may be configured as an elliptical diffuser optically coupled with one or more light sources 88 with the cavity 84 defined between each respective first segment 108 and the light sources 88. In some instances, the first segment 108 can include an asymmetrical optical element 112 that can produce an elliptical (or an extreme elliptical) diffusion pattern converting the linear point light sources 88 into a generally homogenized line 123 (FIG. 10A) of visible light for a defined length. In various examples, the generally homogenized line 123 (FIG. 10A) of visible light may have a width $W_{L1}$ in a y-direction that is between approximately 1.5 mm and approximately 2.5 mm. In other examples, the generally homogenized line 123 (FIG. 10A) of visible light may have a width $W_{L1}$ in a y-direction that is approximately equal to, less than, or greater than 5 mm. In some instances, the first segment 108 may be configured to produce sixty (60) degrees by one (1) degree ellipticity, forty (40) degrees by one (1) degree ellipticity, twenty (20) degrees by one (1) degree ellipticity, and/or any other desired ellipticity based on the location of the light sources 88 relative to one another.

In some instances, the second segment 110 may be interspersed between the first segments 108. The second segment 110 may be configured to soften and/or homogenize incident light emanated from the light sources 88 and received by the diffuser 96 at a location external from the first segment 108. In various examples, the optical elements 114 within the second segment 110 may be configured as a symmetrical diffuser of thirty (30) degrees, sixty (60) degrees, eighty (80) degrees, and/or any other optic (e.g., any lenslet, microstructure, pillow lens, etc.).

As illustrated, the first segment 108 may include one or more optical elements 112 that are a first "z-distance", or vertical distance, from the nearest light source 88 while the second segment 110 may include one or more optical elements 114 that are a second z-distance from the nearest light source 88. In some instances, the second distance may be greater than the first distance, which may allow for greater dispersion of the light that is provided through the second segment 110.

As illustrated in FIG. 10B, the asymmetrical optical element 112 may be generally aligned along an axis, or any other shape, such that the light emanated from proximate light sources may be collimated into a defined pattern, such as a line, and/or any other object. As such, by discrete placement of the asymmetrical optical element 112 versus the optical elements 114 within the second segment 110, various symbols may be formed and/or illuminated by energizing defined light sources 88.

Figure 11A:
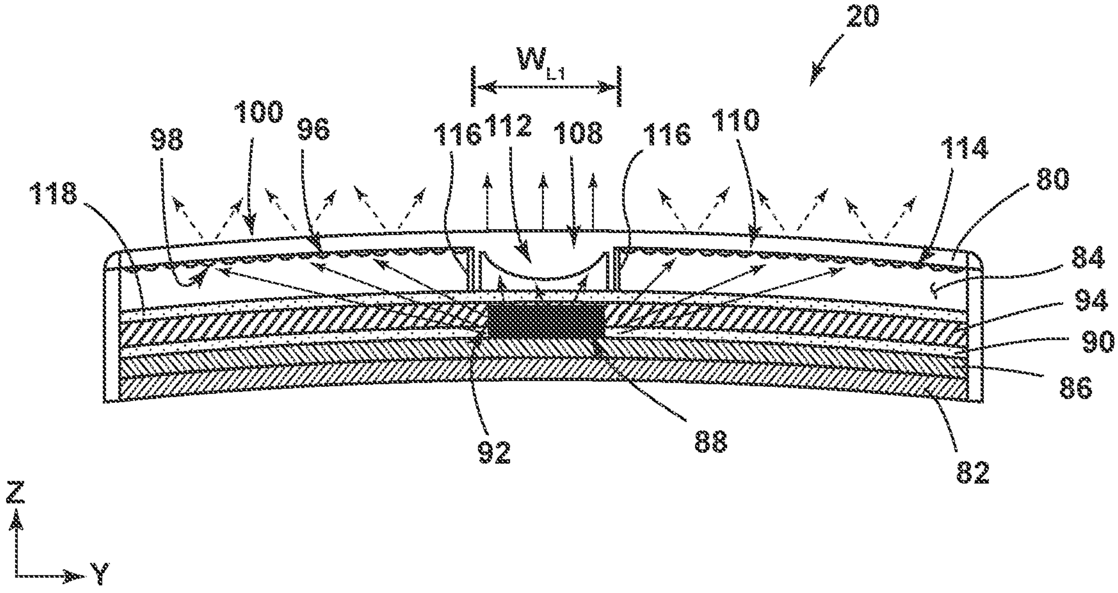
FIG. 11A is a cross-sectional view of the lighting system of FIG. 4 taken along the line IXA-IXA in accordance with various aspects of the present disclosure.
Figure 11B:
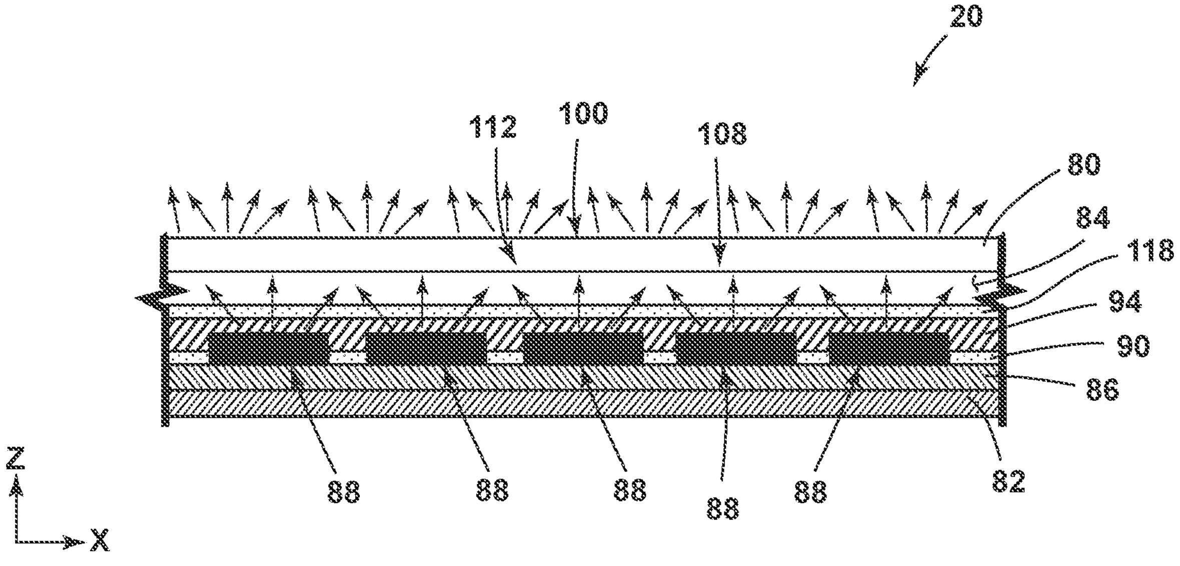
FIG. 11B is a cross-sectional view of the lighting system of FIG. 4 taken along the line DCB-DCB in accordance with various aspects of the present disclosure.
Figure 12A:
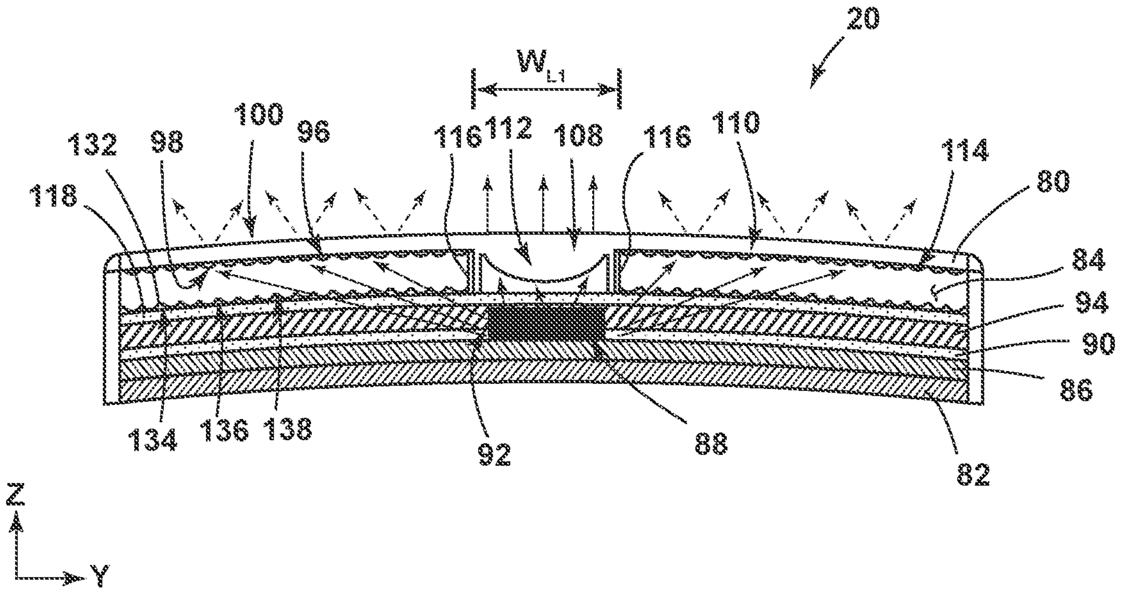
FIG. 12A is a cross-sectional view of the lighting system of FIG. 4 taken along the line IXA-IXA in accordance with various aspects of the present disclosure.
Figure 12B:
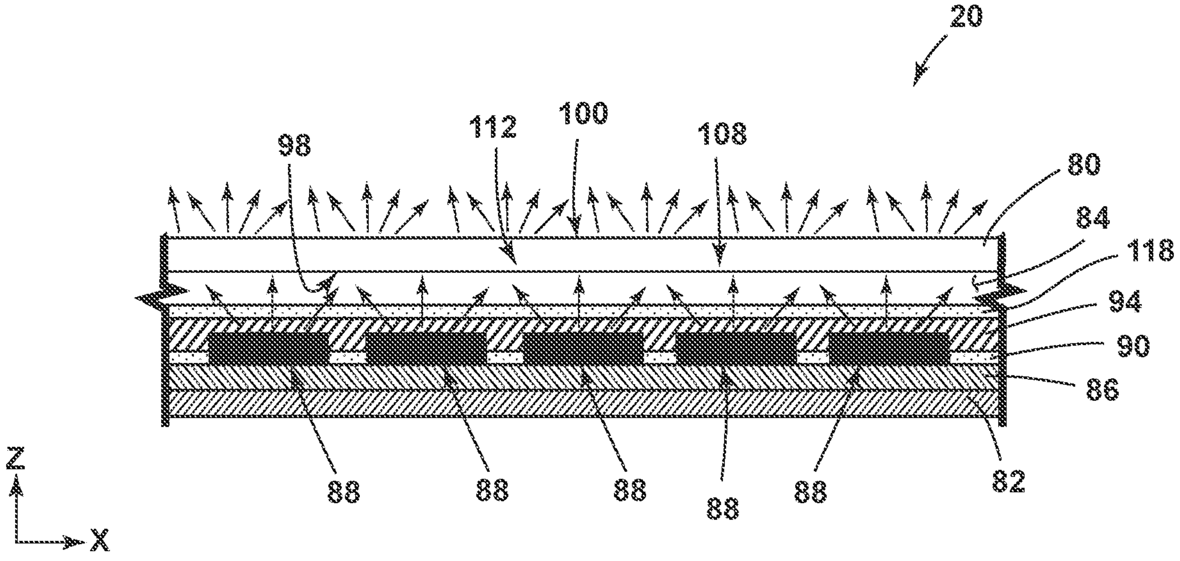
FIG. 12B is a cross-sectional view of the lighting system of FIG. 4 taken along the line DCB-DCB in accordance with various aspects of the present disclosure.

Referring now to FIGS. 11A and 11B, alternatively to the first segment 108 illustrated in FIGS. 10A and 10B, in some examples, the first segment 108 may include an optical element 112 having a convex shape. However, the shape of the optical element 112 may also be concave, rippled, and/or free-form shaped. As shown with convex light shaping, light rays incident are focused and emerge through the optical element 112 more collimated than before. The higher collimated light can produce higher luminous intensity and throw. As used herein, light throw refers to light that can produce higher illuminance at a 30 meters distance than a light with a wider distribution angle.

In some instances, light emanating from lateral light sources 88 may be reflected and recycled by a reflector element 116, which may be positioned on one or more internal and/or external sides of the optical element 112.

With further reference to FIGS. 11A and 11B, in some instances, the light emerging from the light sources 88 may pass through an initial diffusive element 118, e.g., which may include elliptical micro-optical elements. In various examples, the initial diffusive element 118 can reflect or absorb light preserving the definition of the light emerging through the optical element 112, 114 of the first segment 108 and/or the second segment 110.

Referring now to FIGS. 12A-13B, in some examples, a diffusive structure 132 may be positioned between the light sources 88 and the diffuser 96. In various examples, the diffusive structure 132 can reflect or absorb light preserving the definition of the light emerging through the optical elements 112, 114 of the first segment 108 and/or the second segment 110.

Figure 13A:
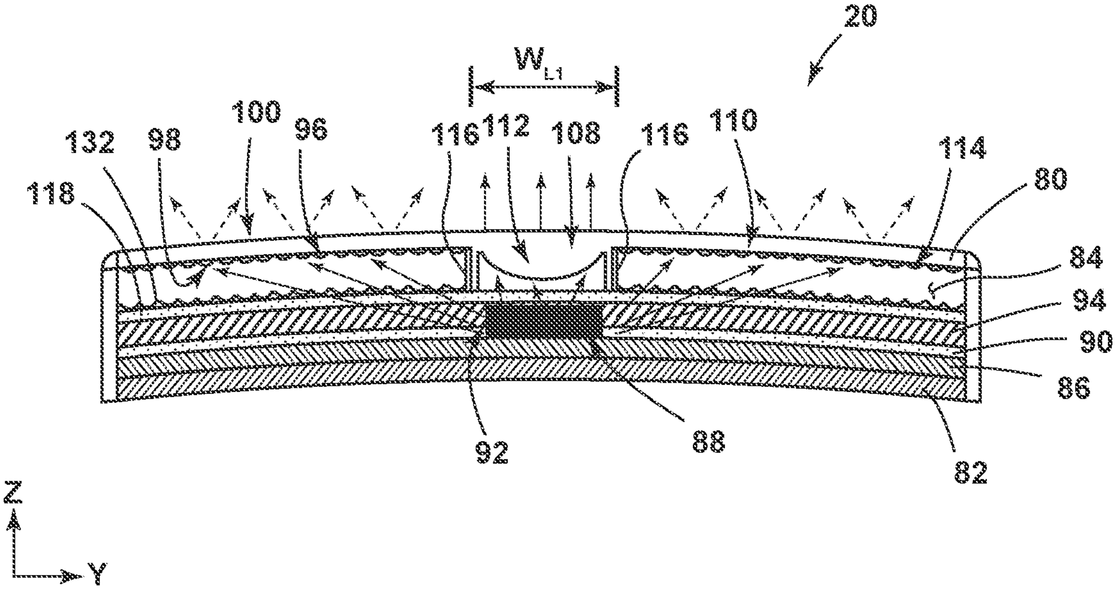
FIG. 13A is a cross-sectional view of the lighting system of FIG. 4 taken along the line IXA-IXA in accordance with various aspects of the present disclosure.
Figure 13B:
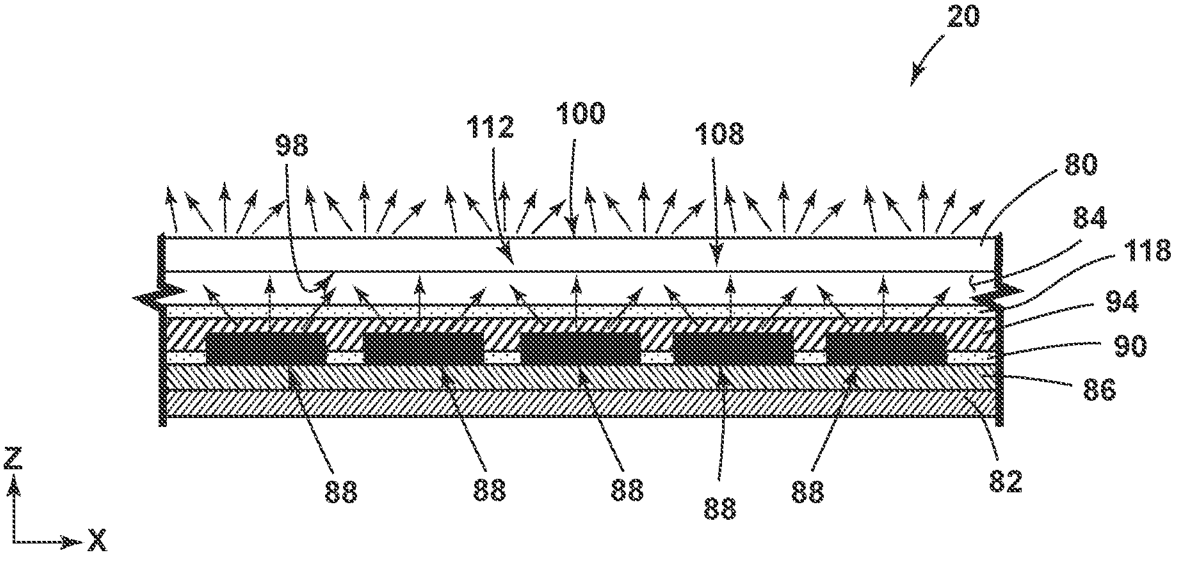
FIG. 13B is a cross-sectional view of the lighting system of FIG. 4 taken along the line DCB-DCB in accordance with various aspects of the present disclosure.

In some examples, such as the one illustrated in FIGS. 13A and 13B, the diffusive structure 132 may include light directing and/or wavelength altering particles. For instance, the particles may include phosphor particles 134, emulsifier particles 136, and/or lens shaping particles 138. When combined in function, the particle loading consisting of, for example, twenty percent (20%) to sixty-five percent (65%) phosphor particle 134 loading by mass, three-tenths percent (0.3%) to one and a half percent (1.5%) emulsifier particles 136, and lens shaping particles 138 of weight % one percent (1%) to ten percent (10%) with the unique shape of the cover 80, a controlled light distribution can be produced.

In various examples, the LED phosphor particles 134 may be comprised of YAG, LuAg, GAL, KSF, Si3N4, and other materials. In some instances, the particle size D50 can range between Sum and 20 um. In various implementations, larger particle size results in higher quantum efficiency, but smaller size particle may also be used to result in tighter packing density near the light source 88 for thermal transfer of the non-radiative heat produced through wavelength conversion.

In various examples, to produce uniform wavelength converted color, the particles 134, 136, 138, for example, may be uniformly distributed so that the uniform path length of the pump light results in uniform wavelength conversion. The density and spatial distribution of the phosphor conversion particles 134 may have a dramatic effect on the wavelength of the light. The emulsifier particles 136 modify the refractive index of the silicone and reduce the clumping of the phosphor particles.

The emulsifier particles 136 may be comprised of CaF, ZrO2, and TiO2, with ideal particle sizes between nano-size 15-50 nm and micro-sized 5-20 μm. The emulsifier particles 136 can raise the index of refraction of the material composite to better match the phosphor particles 134 thereby reducing scattering and enhancing light distribution control optical elements of the lighting system 20.

The lens shaping particles 138 may be formed of nano-sized hydrophobic fumed silica or SiO2. In some instances, the lens shaping particles 138 may have a D50 particle size of 8-30 nm. In addition, the surface of the diffusive structure may be modified to be hydrophobic thereby repelling electrostatic effects which tend to bind and clump the phosphor particles 134 together resulting in undesirable scattering and loss of optical control. The nano-sized fumed silica also allows for increased concentration by weight percent of the loading possible within the silicone composite.

It will be appreciated that the diffuser, or segments thereof, may include the light-directing and/or wavelength altering particles in addition to or in lieu of the diffusive structure containing such particles. In such instances, the particles may include phosphor particles 134, emulsifier particles 136, and/or lens shaping particles 138 and include any of the features provided herein without departing from the teachings of the present disclosure.

Figure 14A:
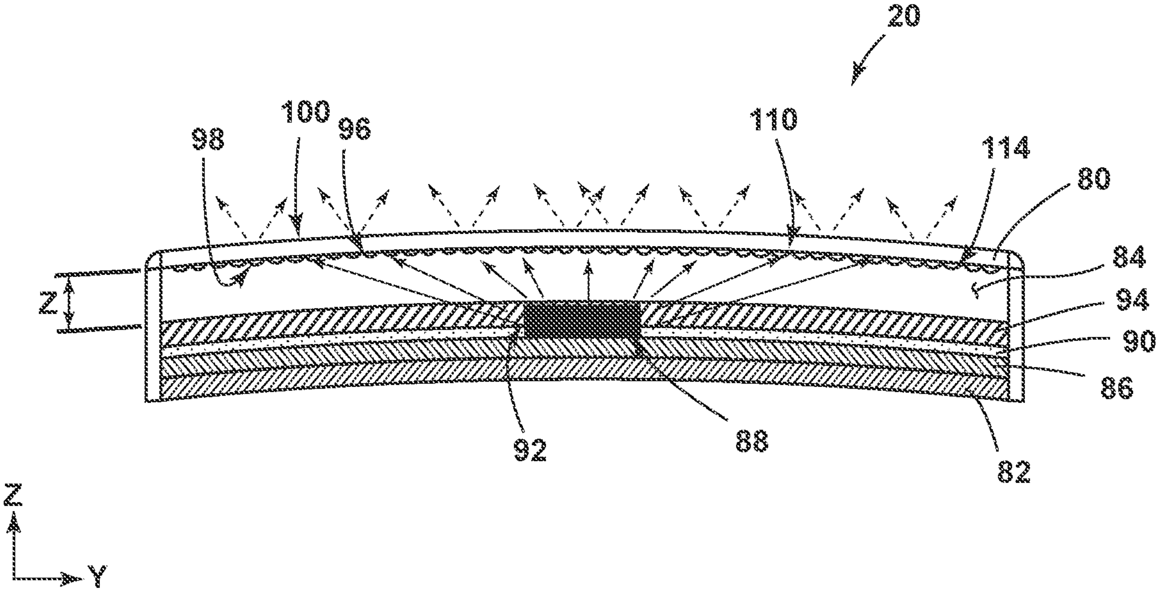
FIG. 14A is a cross-sectional view of the lighting system of FIG. 4 taken along the line XIVA-XIVA in accordance with various aspects of the present disclosure.
Figure 14B:
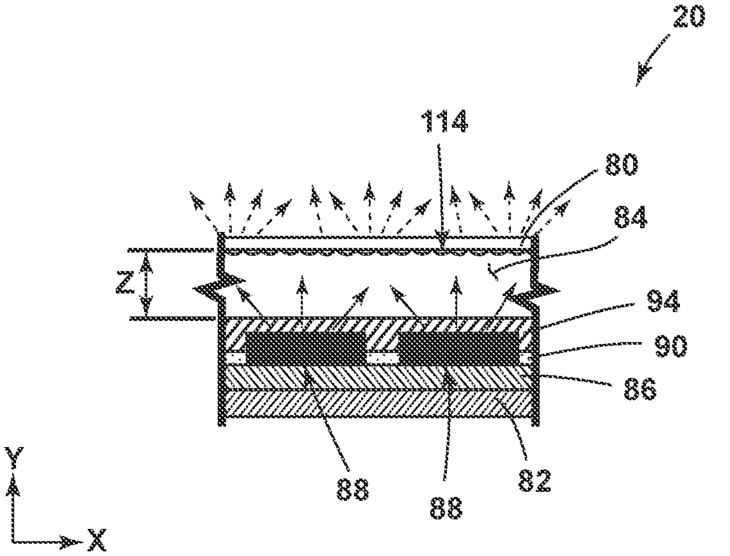
FIG. 14B is a cross-sectional view of the lighting system of FIG. 4 taken along the line XIVB-XIVB in accordance with various aspects of the present disclosure.

Referring now to FIGS. 14A and 14B, in some examples, the second region 104 may include one or more segments 120 having optical elements 122. As provided herein, the optical elements 122 may be separated from the light sources 88 by a z-distance, which may be generally consistent within the second region 104. Alternatively, a first optical element 122 within the second region 104 may have a varied z-distance from a second optical element 122 within the second region 104. In various examples, the optical elements 122 within the second region 104 may be configured as a symmetrical diffuser of thirty (30) degrees, sixty (60) degrees, eighty (80) degrees, and/or any other optic (e.g., any lenslet, microstructure, pillow lens, etc.) can be used to produce smooth appearance.

Figure 15:
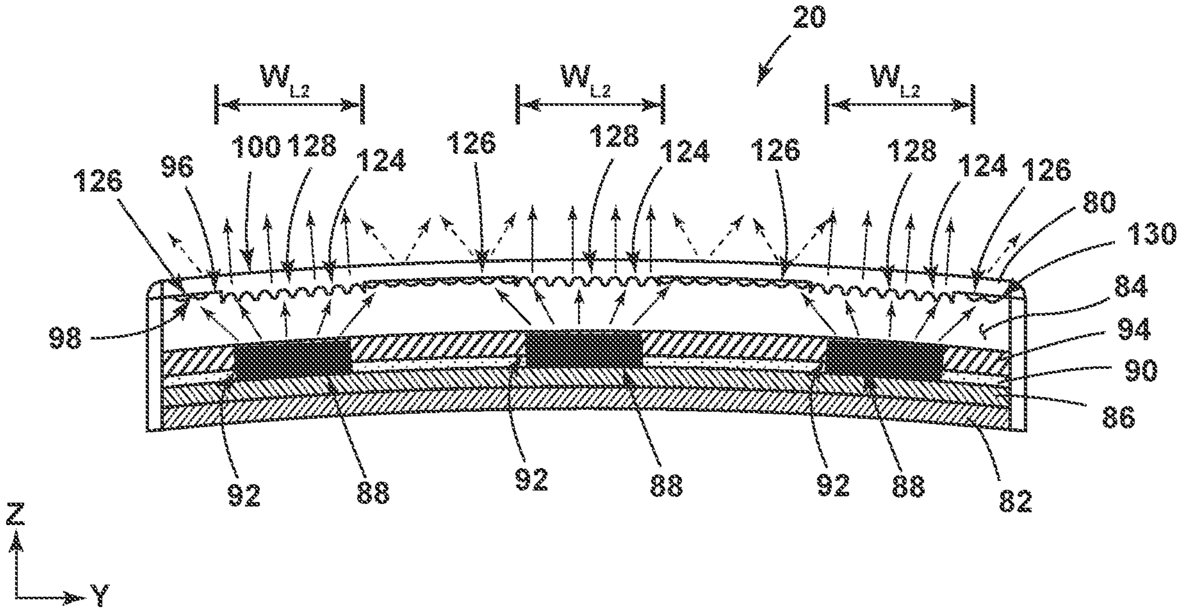
FIG. 15 is a cross-sectional view of the lighting system of FIG. 4 taken along the line XV-XV in accordance with various aspects of the present disclosure.
Figure 16:
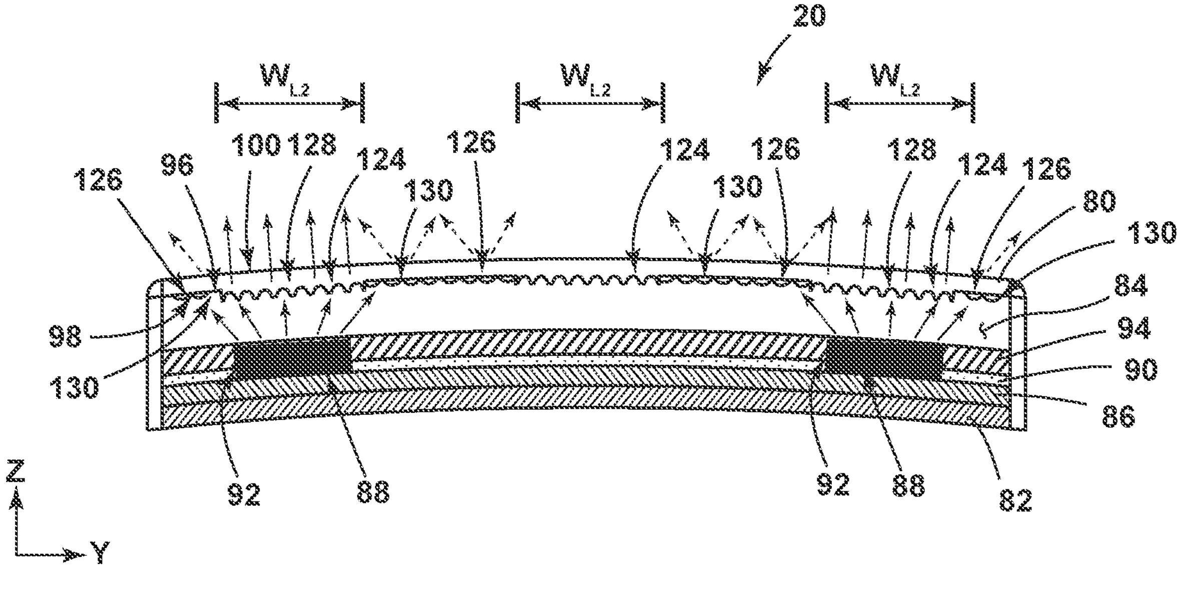
FIG. 16 is a cross-sectional view of the lighting system of FIG. 4 taken along the line XVI-XVI in accordance with various aspects of the present disclosure.

Referring now to FIGS. 15 and 16, the third region 106 of the diffuser 96 may include a first segment 124 and a second segment 126. The first segment 124 may include a first optical element 128, which may be configured as an elliptical diffuser optically coupled with one or more light sources 88. In some instances, the first segment 124 can produce an elliptical (or an extreme elliptical) diffusion pattern converting the linear point light sources 88 into a generally homogenized line 123 (FIG. 10A) of visible light for a defined length. For example, the generally homogenized line 123 (FIG. 10A) of visible light may have a width $W_{L2}$ in a y-direction that is between approximately 1.5 mm and approximately 2.5 mm. In other examples, the generally homogenized line 123 (FIG. 10A) of visible light may have a width $W_{L2}$ in a y-direction that is less than 5 mm or greater than 5 mm. Further, it is contemplated that the width $W_{L2}$ of each homogenized line 123 (FIG. 10A) of visible light within the third region 106 (or the first region 102) may be common or varied with any other line within that region 106 and/or within any other region 102, 104 of the lighting system 20. In various examples, the first segment 124 may be configured to produce ninety-five (95) degrees by twenty-five (25) degrees ellipticity and/or any other desired ellipticity.

In some instances, the second segment 126 may be interspersed between various portions of the first segment 124. The second segment 126 may be configured to soften and/or homogenize incident light emanated from the light sources 88 and received by the third region 106 of the diffuser 96 at a location external from the first segment 124. In various examples, the optical elements 130 within the second segment 126 may be configured as a symmetrical diffuser of thirty (30) degrees, sixty (60) degrees, eighty (80) degrees, and/or any other optic (e.g., any lenslet, microstructure, pillow lens, etc.) can be used to produce smooth appearance.

As illustrated, the first segment 124 may include one or more optical elements 128 that are a first z-distance from the nearest light source 88 while the second segment 126 may include one or more optical elements 130 that are a second z-distance from the nearest light source 88. In some instances, the second distance may be greater than the first distance, which may allow for greater dispersion of the light that is provided through the second segment 126.

Figure 17:
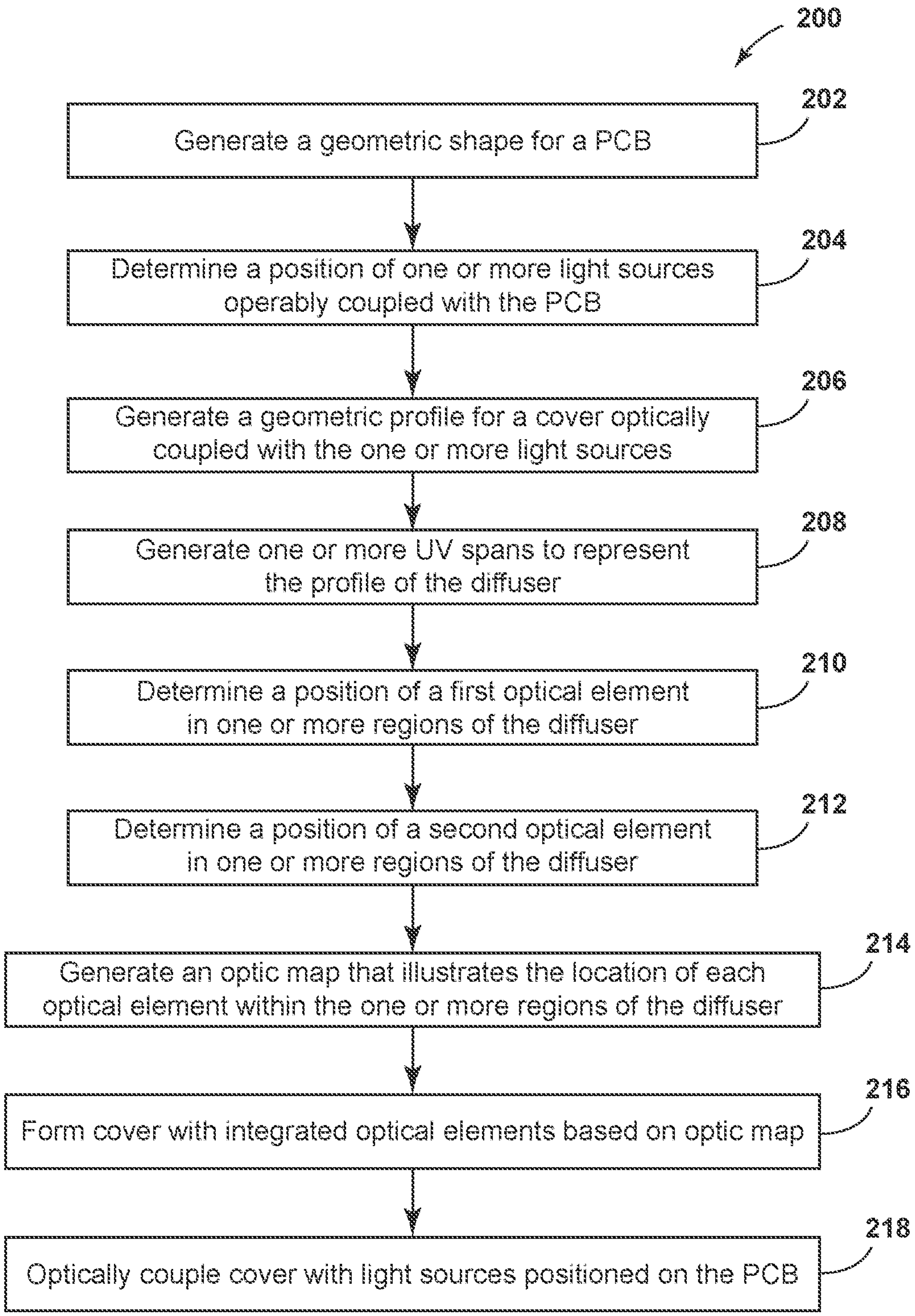
FIG. 17 is a method for manufacturing a lighting system in accordance with various aspects of the present disclosure.

Now referring to FIGS. 17-22, a method of manufacturing a lighting system is provided in accordance with aspects of the present subject matter. In general, the method 200 will be described herein with reference to the lighting system 20 described herein. However, it will be appreciated that the disclosed method 200 may be implemented with lighting systems having any other suitable configurations. In addition, although FIG. 17 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 17, at (202), the method 200 can include generating a geometric shape for a circuit board 86, such as a printed circuit board (PCB) for example, which may be accomplished with a computing system. The geometric shape may be non-planar. In such instances, a flexible circuit board 86 that can be capable of conforming to a non-linear profile in one or more directions without degradation in performance may be implemented.

At (204), the method 200 can include determining a position of one or more light sources operably coupled with the circuit board 86 with the computing system. As provided herein, each of the light sources may be configured as a respective LED chip on board (COB). In some examples, the LED COB can be designed to occupy 100-350 μm (e.g., mini chips) and 2-100 μm (e.g., microchips). By placing many LEDs in either one-dimensional (1-D), two-dimensional (2-D) patterns or 2-D pictograms, or three-dimensional (3-D) patterns or 3-D pictograms with animation, lighting functions for informational or communication purposes may be achieved. Moreover, each LED within the lighting system may be comprised of one or more colors. As such, the lighting system provided herein may provide both high uniformity and animation effects in one or more colors, which can be made possible by the implementation of a mini-chip solution.

At (206), the method 200 can include generating a geometric profile, or geometric shape, for a cover 80 optically coupled with the one or more light sources with the computing system. For instance, as illustrated in FIG. 18, the diffuser 96 may have a concave profile that is similar to the circuit board 86 and light sources 88 thereon.

Referring back to FIG. 17, at (208), the method 200 can include generating one or more UV spans to represent the profile of the diffuser. In some instances, the profile of the diffuser may be divided into smaller portions, which may be referred to as patches, of which one patch 140 is highlighted in FIG. 18. To adequately render the diffuser 96, a plurality of patches may be used. For the sake of simplicity, a single patch 140 will be further detailed. Also, the various other curved lines in FIG. 18 are not there to suggest other patches (although they might) but are instead offered as an aid in appreciating the shape of the surface. Furthermore, it will be understood that, although the surface resembles a concave shape, the disclosure provided herein is applicable to any surfaces (e.g., free-form), especially those rendered from parametric B-spline descriptions.

A portion of a parameter space 142 is associated with the patch 140. The portion may be referred to as a span. To describe a three-dimensional surface in XYZ space, a two-dimensional parameter space may be employed. In the present example, the two parameters are u and v, and each is allowed to vary between associated maximum and minimum values. In various examples, a set of parametric patch generation equations can map values in the parameter space 142 into XYZ space to produce the (X, Y, Z) triples that lie on the patch 140. It will be appreciated that any computing system may be used to produce B-spline descriptions of desired solid objects and surfaces.

Figure 18:
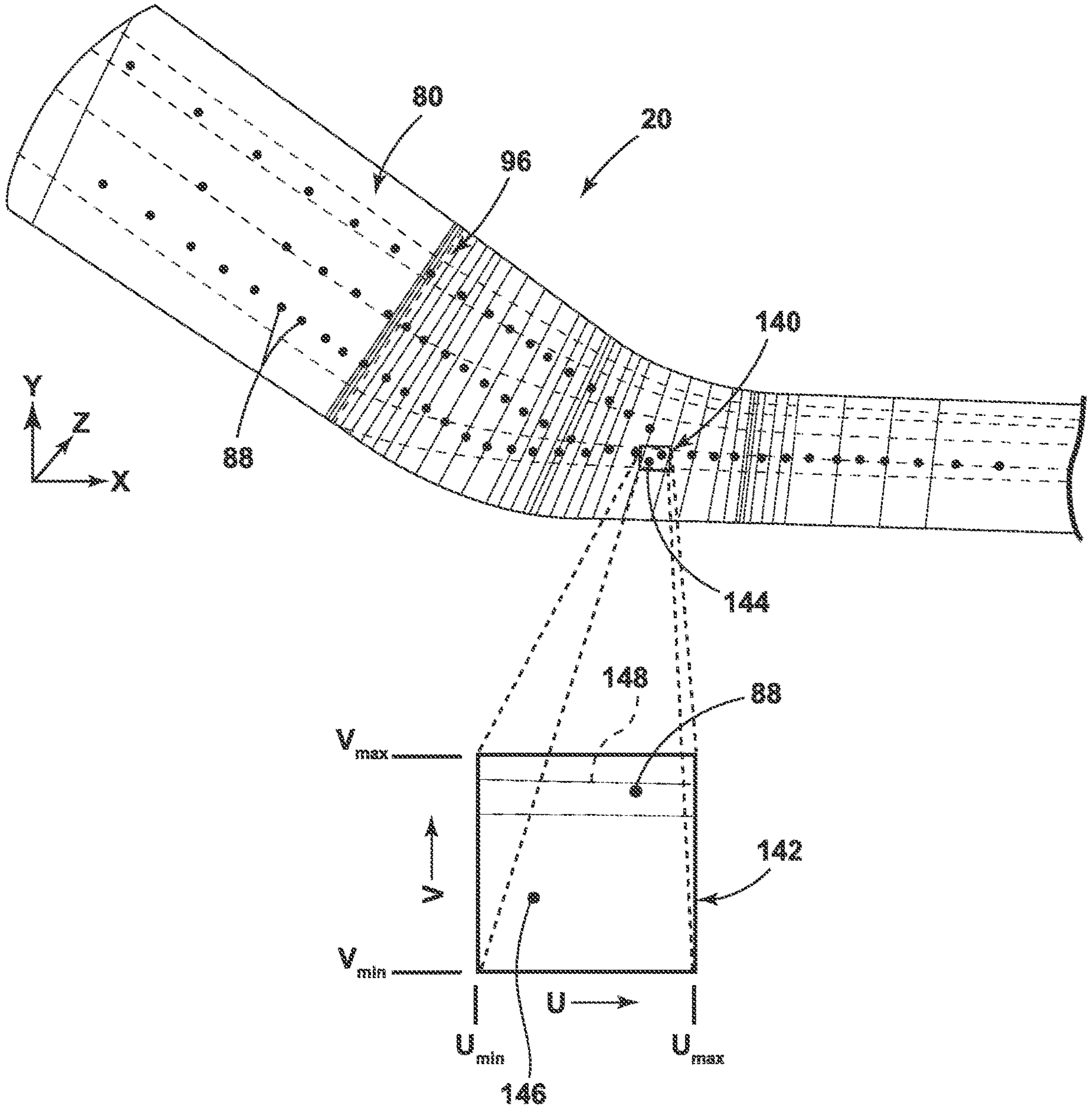
FIG. 18 is an illustration of a profile of the lighting system in XYZ space approximated by patches formed by mapping spans of a two-dimensional (UV) parameter space into three-dimensional (XYZ) space with parametric patch generation functions in accordance with various aspects of the present disclosure.
Figure 19:
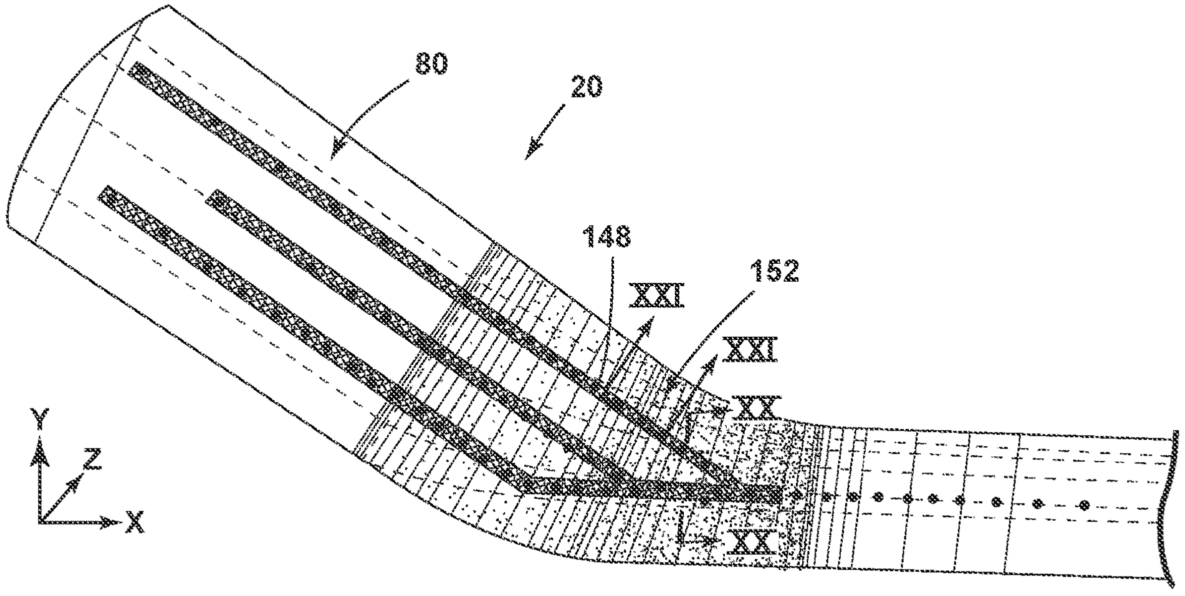
FIG. 19 is a top plan view of the lighting system having a plurality of UV spans in accordance with various aspects of the present disclosure.
Figure 20:
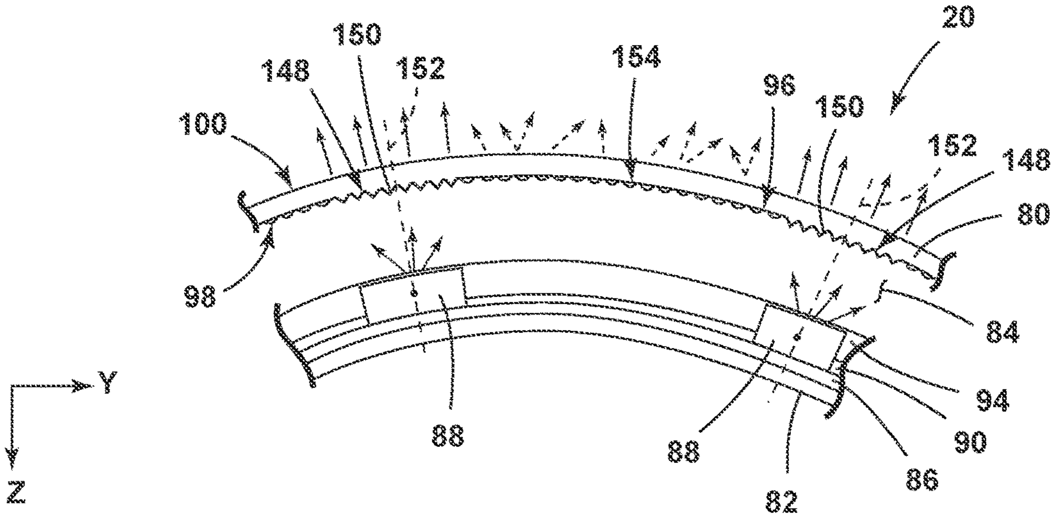
FIG. 20 is a cross-sectional view of the lighting system of FIG. 19 taken along the line XX-XX in accordance with various aspects of the present disclosure.
Figure 21:
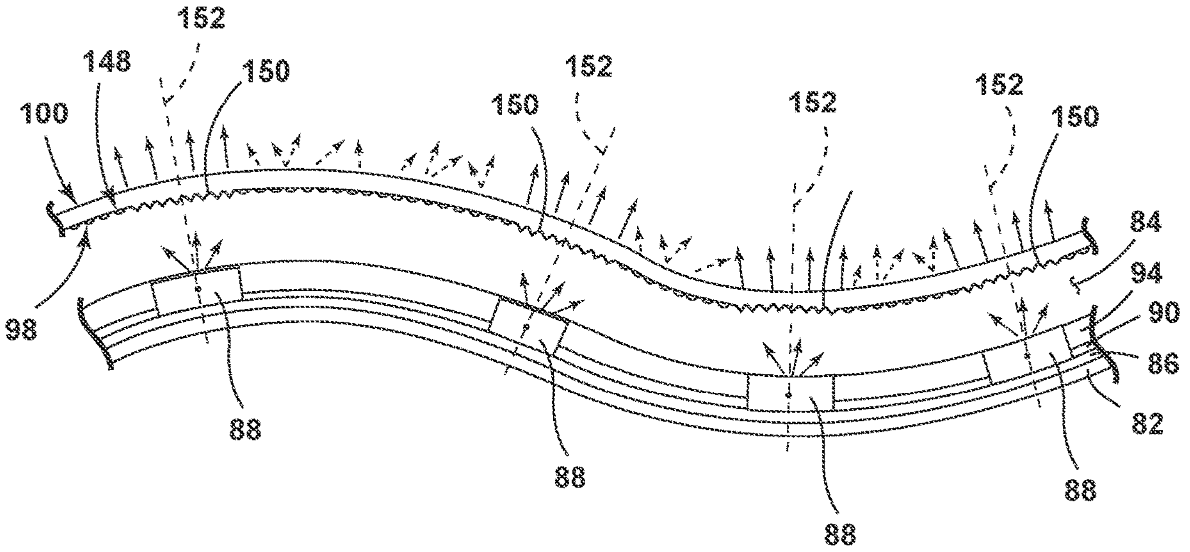
FIG. 21 is a cross-sectional view of the lighting system of FIG. 19 taken along the line XXI-XXI in accordance with various aspects of the present disclosure.

In the example of FIG. 18, each point 144 on a surface of interest can be represented by a corresponding point 146 in some portion of a parameter space 142. In general, the surface will be composed of a multiplicity of patches. For each patch 140 upon a surface in XYZ space, three (or perhaps four) patch generation functions of u and v may be produced. The variables u and v belong to the parameter space 142. The x coordinate of the point 144 is found by evaluating a (polynomial) function $F_x$ (u,v). Corresponding functions $F_y$ and $F_z$ produce the y and z coordinates of the point 144. A more general case (rational B-splines) for three coordinates can the following functions:

$$x=F_x(u,v)/H(u,v), \quad (1)$$

$$y=F_y(u,v)/H(u,v), \text{ and} \quad (2)$$

$$z=F_z(u,v)/H(u,v). \quad (3)$$

In the above functions, each of the functions $F_x$, $F_y$, and $F_z$ has been rationalized through division by a function H. The method 200 to be described is compatible with either rational or nonrational nonuniform B-spline representations. Through the use of B-spline patch generation functions, approximations of the desired surface over small regions. This piecewise approximation divides the parameter space into regions, called spans. The piecewise approximation is what divides the surface into the corresponding patches 140. To render a patch 140, its corresponding B-spline functions are evaluated over the range of the associated span. According to the desired resolution for the displayed object (i.e., the polygon size), suitable step sizes are selected for increments to u and v. The parameter, u is allowed to range in equal steps from $u_{min}$ to $u_{max}$, while the parameter v ranges in equal steps (not necessarily the same as those for u) from $v_{min}$ to $v_{max}$.

Referring back to FIG. 17, at (210), the method 200 can include determining a position of a first optical element in one or more regions of the diffuser. For instance, with reference to FIGS. 20 and 21, based on the location of each light source 88 within a respective patch, a position of the first optical element 148 relative to each light source 88 may be determined. In some examples, based on the curvature of the circuit board 86, the orientation of the light source 88, and the similar curvature of the cover 80, a position of a center portion of a light source 88 may be offset from a center portion 150 of the first optical element 148 relative to a light source central axis 152 that is perpendicular to the circuit board 86. By determining the position of each light source 88 within a patch, linear homogenized lines of light may be formed from the discrete light sources 88 while accounting for the curvature of the lighting system 20.

Figure 22:
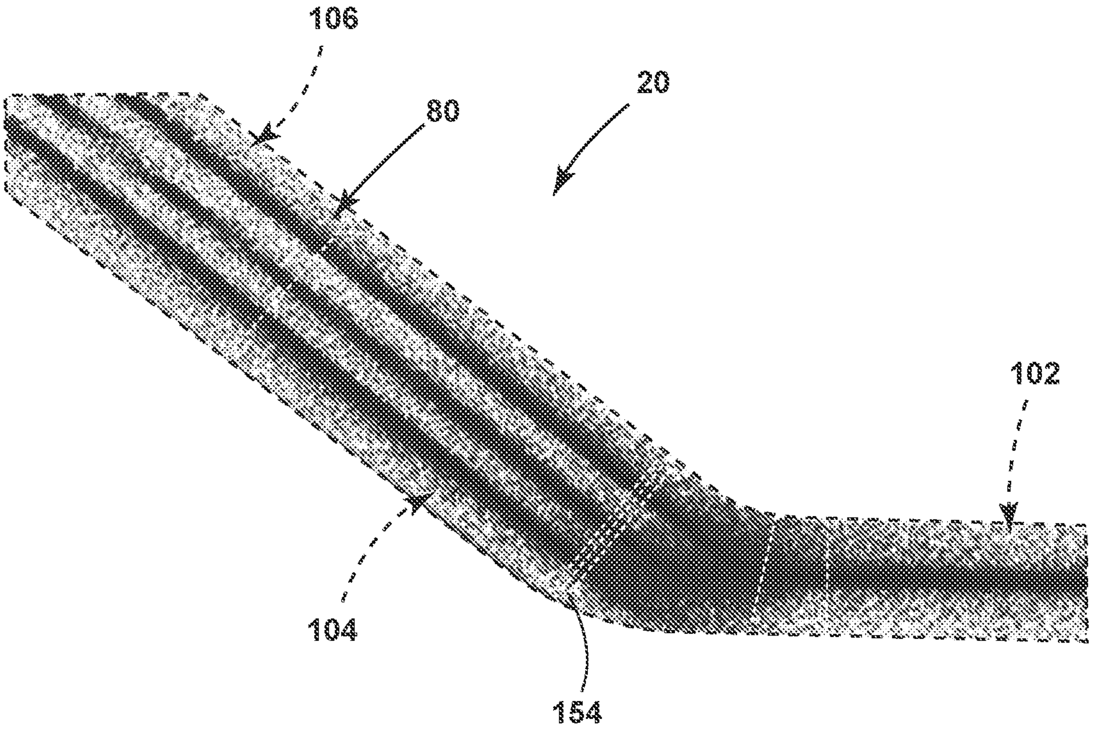
FIG. 22 illustrates the lighting system in an illuminated state in accordance with various aspects of the present disclosure.

Referring back to FIG. 17, at (212), the method 200 can include determining a position of a second optical element in one or more regions of the diffuser. The second optical element may be positioned in an offset location from the first optical element. For instance, with reference to FIGS. 18 and 19, based on the curvature of the circuit board 86, the orientation of the light sources 88, and the similar curvature of the cover a position of the second optic may be determined that is configured to reduce unintended light patterns to be emitted through the cover 80, such as homogenized lines, which are generally illustrated in FIG. 22 as the dark portions of the lighting system 20. Once a position of the second optical element 154 is determined, a randomization algorithm and/or any other method may be used to generate the second optical element 154. In addition, as provided herein, the second optical element 154 may have a varied concentration within the third region 106, which may be inputted into the randomization algorithm.

With further reference to FIG. 17, at (214), the method 200 can include generating an optic map that illustrates the location of each optical element within the one or more regions of the diffuser, which may be accomplished with the computing system. In some instances, the optic map may be used to generate a tool to produce the cover 80 (FIG. 4) with the integrated optical elements 112, 114, 122, 128, 130 (FIGS. 7-16). For instance, the optic map may be used to generate an embossing pattern for an injection mold tool, which is then used to produce the cover having the integrated optical elements 112, 114, 122, 128, 130 (FIGS. 7-16).

At (216), the method 200 can include forming a cover with integrated optical elements based on the optic map. At (218), the method 200 can include optically coupling the cover with light sources 88 positioned on the circuit board 86.

It will be appreciated that one or more steps of method 200 may be implemented by a computing system. In general, the computing system may comprise any suitable processor-based device known in the art, such as a computing device or any suitable combination of computing devices. Thus, in several embodiments, the computing system may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory device(s) of the computing system may generally comprise memory element(s) including, but not limited to, a computer-readable medium (e.g., random access memory (RAM)), a computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the computing system to perform various computer-implemented functions, such as one or more aspects of the method described herein. In addition, the computing system may also include various other suitable components, such as a communications circuit or module, one or more input/output channels, a data/control bus, and/or the like.

In various examples, the method 200 may implement machine learning methods and algorithms that utilize one or several vehicle learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update the boom deflection model. In some instances, the vehicle learning engine may allow for changes to the boom deflection model to be performed without human intervention.

It is to be understood that one or more steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

Referring now to FIGS. 23-28, various examples of optical elements 112, 114 that may be used to form one or more regions of the diffuser 96 are generally illustrated. As provided herein, in several implementations, the diffuser 96 may be used to reduce dips in light produced between areas of high illuminance above respective light sources 88 (e.g., LED chips). In various examples, the diffuser 96 may be integrally formed with the cover 80 and/or attached thereto. In addition, a z-pitch z may be defined between the diffuser 96 and the light sources 88 to allow for light spreading prior to the light emanated from the light source reaching the diffuser 96.

With further reference to FIGS. 23-26, as provided herein, a first region of the diffuser 96 may include an asymmetrical optical element 112 that can produce an elliptical (or an extreme elliptical) diffusion pattern converting the linear point light sources 88 into a generally a non-symmetrical shape of visible light as generally illustrated by the example ray traces that may be produced by each of the illustrated optical elements 112. For example, the light emanated from the linear point light source 88 may be converted to an illumination pattern having a width that is greater than the height at a defined distance, or vice versa.

Figure 23:
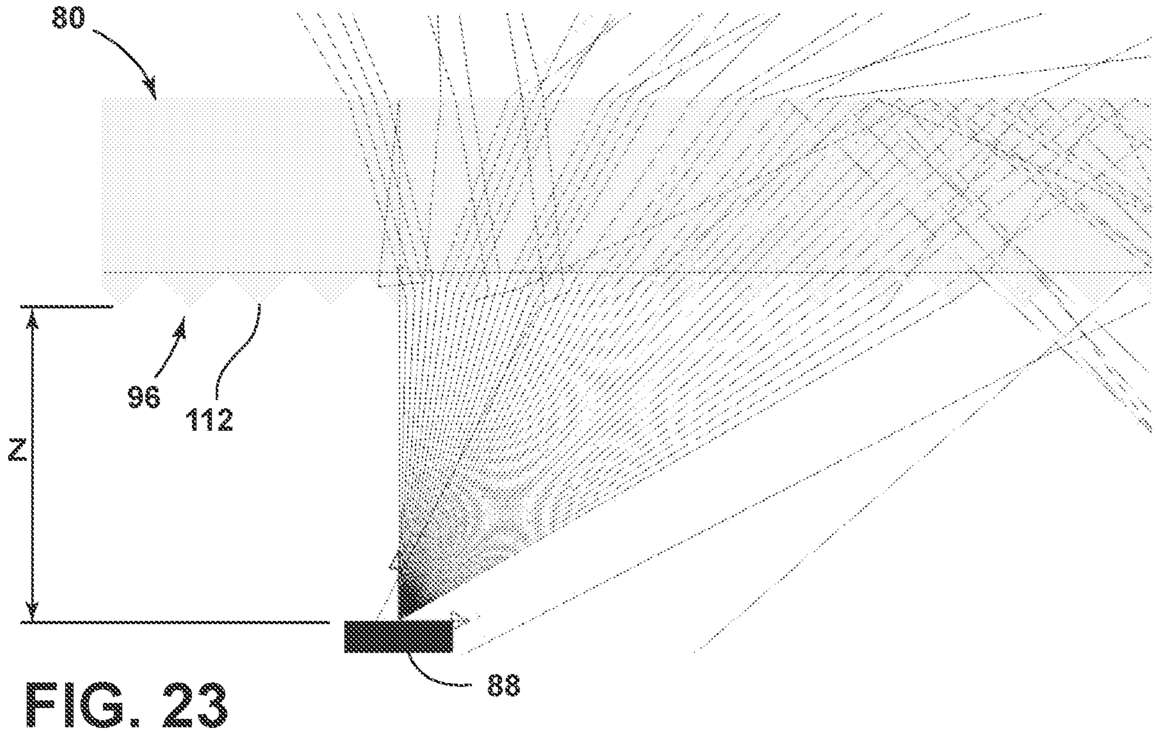
FIGS. 23-28 illustrate examples of optical elements that may be used to form one or more regions of the diffuser of the lighting system in accordance with various aspects of the present disclosure.
Figure 24:
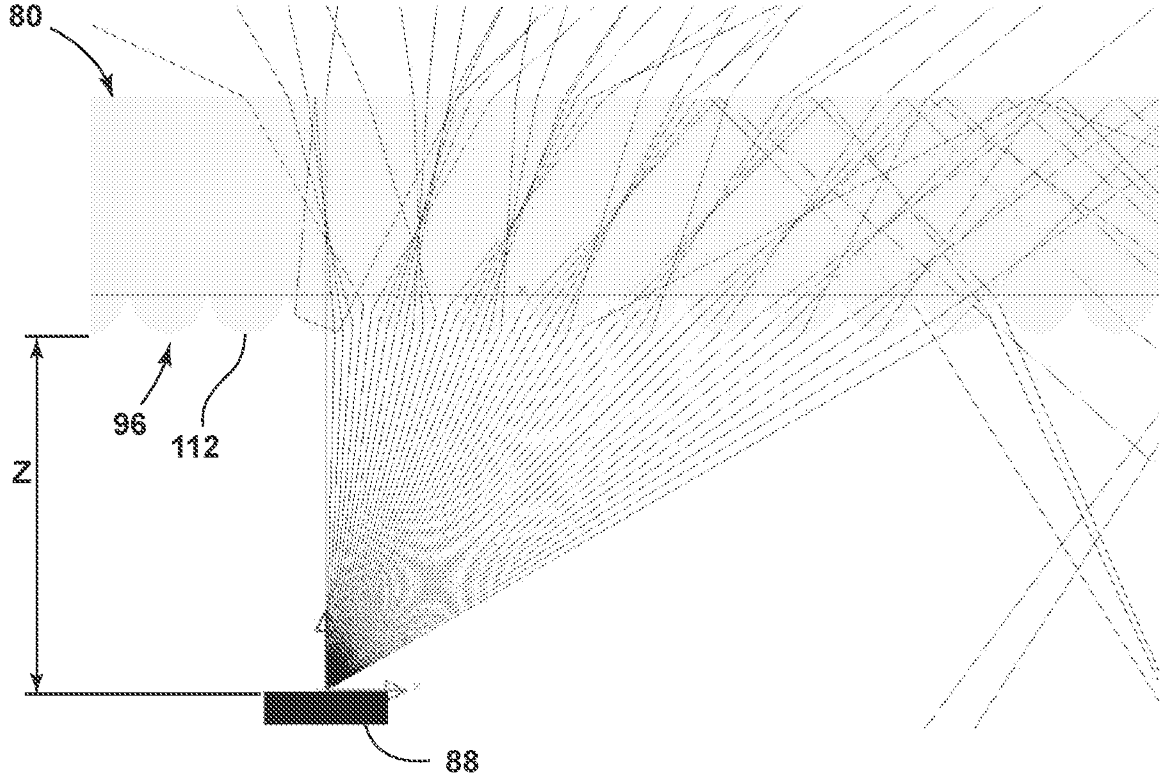
Figure 25:
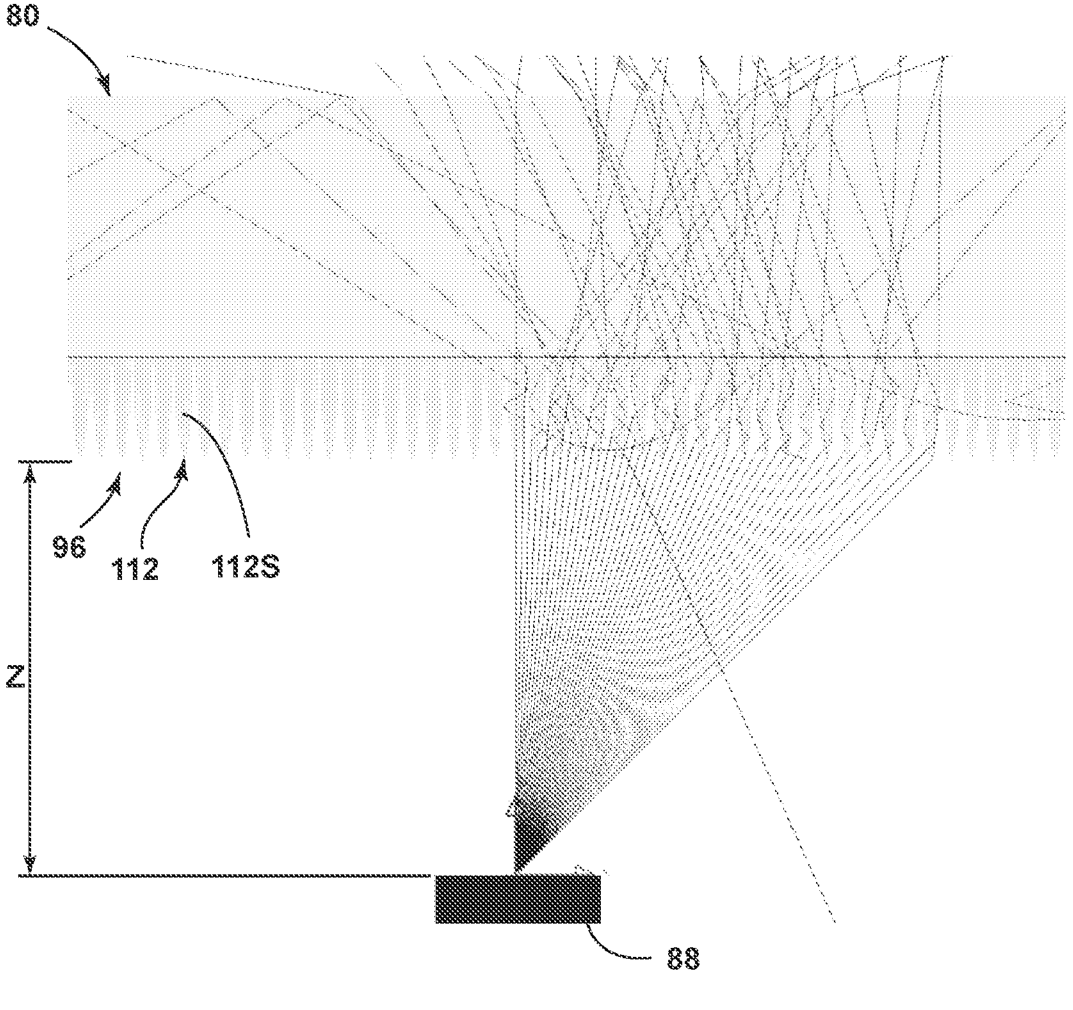

For instance, as shown in FIG. 23, the optical element 112 may be configured as a pyramid array configured to produce an asymmetric illumination pattern. Each of the pyramids within the array may be of an equal and/or varied size from at least one other pyramid. Additionally or alternatively, as shown in FIG. 24, the optical element 112 may be configured as a semi-spherical (and/or spherical) array configured to produce an asymmetric illumination pattern. Each of the semi-spheres within the array may be of an equal and/or varied size from at least one other sphere. Additionally or alternatively, as shown in FIG. 25, the optical element 112 may be configured as a Bezier profile having a high aspect ratio configured to produce an asymmetric illumination pattern. As illustrated, each segment 112 of the asymmetric Bezier profile within the array may be of an equal and/or varied size from at least one other segment 112.

Figure 26:
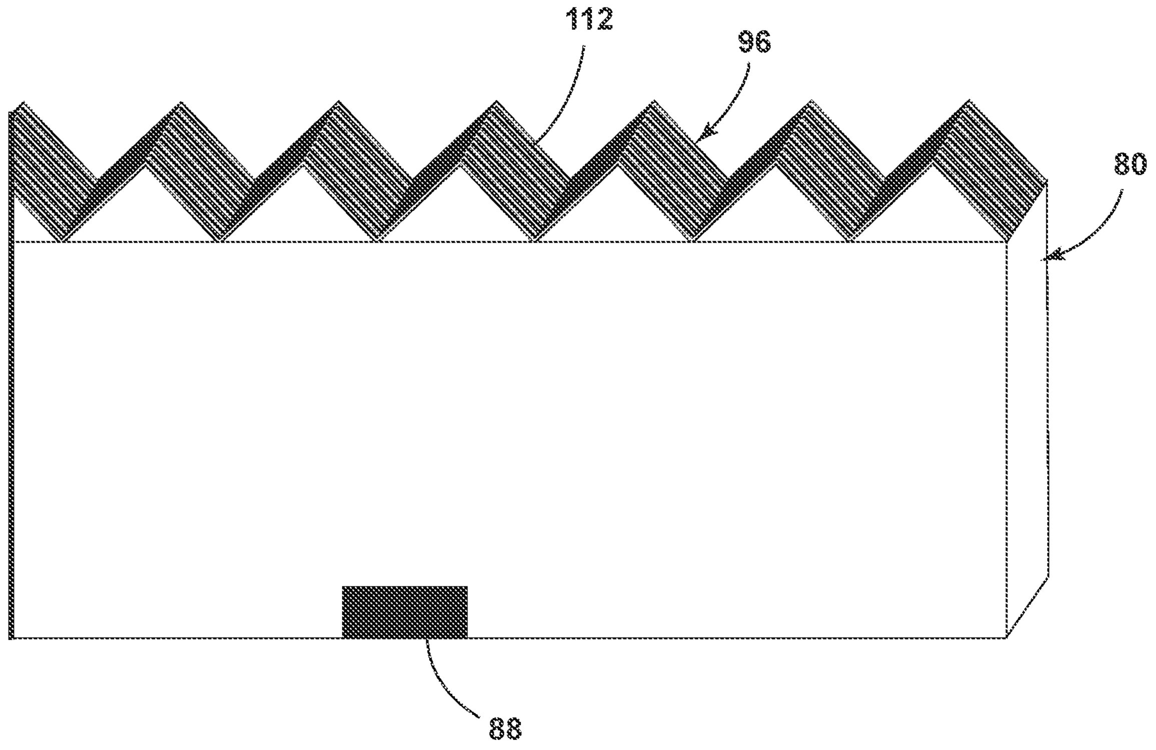

With further reference to FIG. 26, the one or more of the optical elements 112 may be configured as a pyramid array that has a base portion more proximate to the light sources than a point portion. The pyramid array may be configured to produce an asymmetric illumination pattern. Each of the pyramids within the array may be of an equal and/or varied size from at least one other pyramid.

Figure 27:
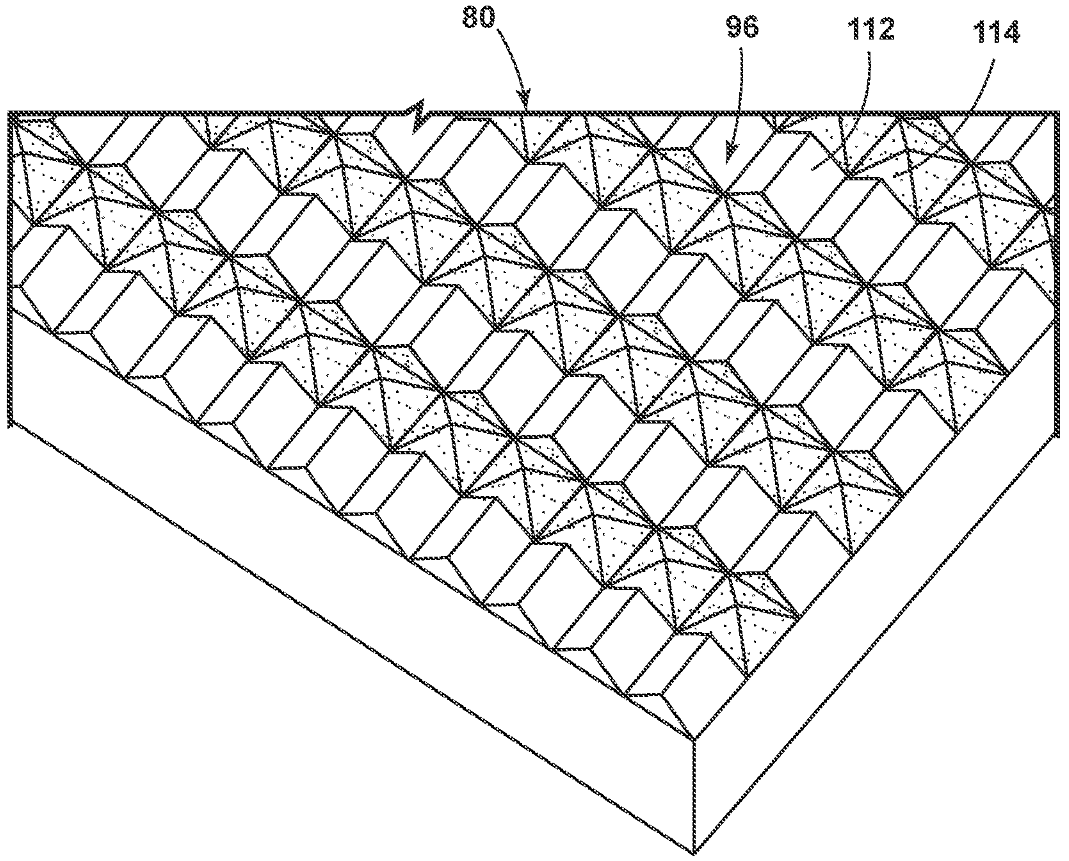
Figure 28:
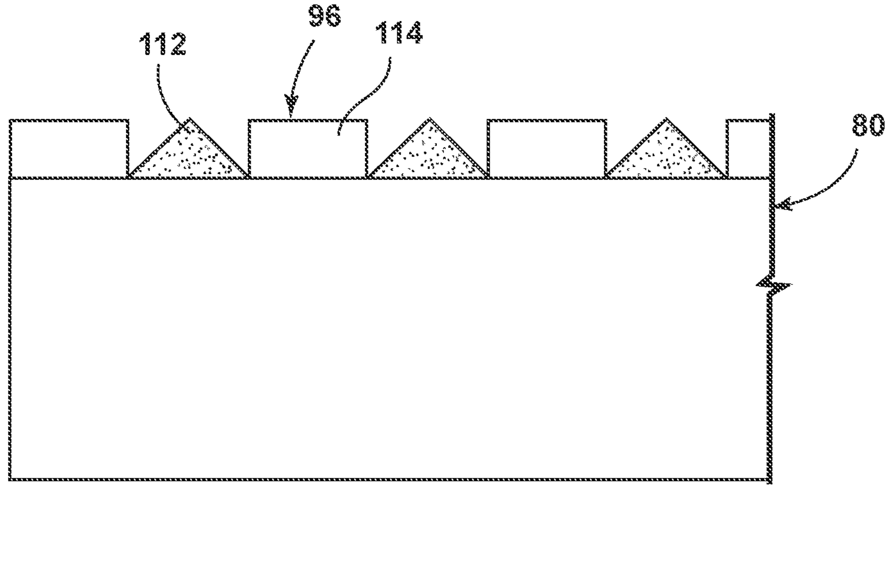

Referring to FIGS. 27 and 28, various views of the cover 80 having bi-directional diffusion capabilities are illustrated. As shown, the diffuser 96 may include both first and second optical elements 112, 114 that are configured with varied geometric shapes from one another to form varied illumination patterns. As provided herein, based on the location of the first optical element 112 and the second optical element 114 relative to each discrete point light source, various illumination patterns may be produced.

Applications of embodiments in the present disclosure can be applied in numerous applications and industries. For example, as noted above, the present disclosure could be used in automotive lighting systems. The lighting system may also be implemented in other transportation industries, such as unmanned vehicles, drones, hoverboards, mopeds, bicycles, motorcycles, or other mobile apparatuses. Similarly, the present disclosure may alternatively be implemented in any other illuminable device, such as branding notifications, safety notifications, protocols, and/or messages. For example, storefronts, houses, billboards, or any marketing surface can utilize the lighting system disclosed herein.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A lighting system for a vehicle, the lighting system comprising:

a light source comprising one or more LED chips;

a cover optically coupled with the light source along a light source central axis; and a diffuser integrally formed with the cover, the diffuser defining a first region and a second region, wherein the first region has a first asymmetrical optical element and the second region has a first symmetrical optical element, the first asymmetrical optical element producing an elliptical diffusion pattern, wherein the first asymmetrical optical element is positioned a first distance from the light source in a z-direction and the first symmetrical optical element is positioned a second distance from the light source in a z-direction, and wherein the second distance is greater than the first distance.

2. The lighting system of claim 1, wherein the one or more LED chips are configured as mini-chip LEDs or micro-chip LEDs.

3. The lighting system of claim 1, wherein at least one of the one or more LED chips is configured as an LED chip on board (COB).

4. The lighting system of claim 1, further comprising:

a flexible circuit board operably supporting the light source.

5. The lighting system of claim 4, further comprising:

a housing positioned at least partially on an opposing side of the circuit board from the light source, wherein a width of an outer surface of the housing to an outer surface of the cover is less than approximately 6 millimeters.

6. The system of claim 1, wherein the elliptical diffusion pattern produces a homogenized line of visible light for a defined length.

7. The lighting system of claim 6, wherein the homogenized line of visible light has a width in a y-direction that is between approximately 1.5 millimeters and approximately 2.5 millimeters.

8. The lighting system of claim 1, wherein the diffuser further comprises:

a third region positioned between the first region and the second region, wherein the third region includes a first segment including a second asymmetrical optical element and a second segment including a second symmetrical optical element.

9. The lighting system of claim 8, wherein a diffusion pattern of the first asymmetrical optical element is varied from a diffusion pattern of the second asymmetrical optical element.

10. A lighting system comprising:

a flexible circuit board;

one or more LED chips on board operably coupled with the flexible circuit board;

a cover optically coupled with the one or more LED chips on board; and a diffuser integrally formed with the cover, the diffuser defining a first region, a second region, and a third region positioned between the first region and the second region, wherein the first region defines a first segment having a first optical element and a second segment having a second optical element, the second region has a third optical element, and the third region includes interspersed fourth and fifth optical elements, wherein a first LED chip on board of the one or more LED chips on board defines a center portion, wherein the first optical element is optically coupled with the first LED chip on board, and wherein the center portion of the first LED chip on board is offset from a center portion of the first optical element relative to a light source central axis of the first LED chip on board that is perpendicular to the circuit board.

11. The lighting system of claim 10, wherein a concentration of the fourth optical element is varied from a first side portion of the third region to a second side portion of the third region.

12. The lighting system of claim 10, wherein a concentration of the fifth optical element is varied from a first side portion of the third region to a second side portion of the third region.

13. The lighting system of claim 10, wherein the second optical element has a varied diffusion pattern from the first optical element.

14. The lighting system of claim 10, wherein the first optical element is offset from at least one of the one or more LED chips on board based on a curvature of the circuit board, a curvature of the cover, and a z-distance between the at least one of the one or more LED chips on board and the first optical element.

15. The lighting system of claim 10, wherein a concentration of the fifth optical element is varied from a first side portion of the third region to a second side portion of the third region.

16. The lighting system of claim 10, wherein the second optical element has a varied diffusion pattern from the first optical element.

17. The lighting system of claim 10, wherein the first optical element is offset from at least one of the one or more LED chips on board based on a curvature of the circuit board, a curvature of the cover, and a z-distance between the at least one of the one or more LED chips on board and the first optical element.

18. A lighting system for a vehicle, the lighting system comprising:

a light source comprising one or more LED chips;

a cover optically coupled with the light source along a light source central axis;

a diffuser integrally formed with the cover, the diffuser defining a first region and a second region, the first region having a first asymmetrical optical element and the second region having a first symmetrical optical element, the first asymmetrical optical element producing an elliptical diffusion pattern, wherein the first asymmetrical optical element is positioned a first distance from the light source in a z-direction and the first symmetrical optical element is positioned a second distance from the light source in a z-direction, and wherein the second distance is greater than the first distance; and a reflector element positioned on a side of the first asymmetrical optical element, wherein the side of the first asymmetrical optical element is positioned between the light source and the first symmetrical optical element in a z-direction.

* * * * *